United States Patent [19]
Moore et al.

[11] 4,412,252
[45] Oct. 25, 1983

[54] IMAGE REDUCTION SYSTEM

[75] Inventors: Robert S. Moore, Palo Alto, Calif.; Walter F. Wessel, III, Vestal, N.Y.

[73] Assignee: NCR Corporation, Dayton, Ohio

[21] Appl. No.: 269,237

[22] Filed: Jun. 1, 1981

[51] Int. Cl.³ .............................................. H04N 1/02
[52] U.S. Cl. .................................. 358/160; 360/33.1; 358/77; 358/138; 358/287; 364/514; 340/731
[58] Field of Search ............... 358/77, 335, 138, 140, 358/22, 160, 180, 185, 287; 364/515, 518–521; 340/723, 731; 355/55; 365/189; 360/33.1

[56] References Cited

U.S. PATENT DOCUMENTS

| | | | |
|---|---|---|---|
| 3,976,982 | 8/1976 | Eiselen | 358/77 X |
| 4,007,442 | 2/1977 | Findley et al. | 340/172.5 |
| 4,107,665 | 8/1978 | Mayer et al. | 340/324 AD |
| 4,124,871 | 11/1978 | Morris | 358/287 |
| 4,168,489 | 9/1979 | Ervin | 340/146.3 AH |
| 4,183,058 | 1/1980 | Taylor | 358/134 X |
| 4,233,636 | 11/1980 | Harbaugh | 358/287 X |
| 4,241,340 | 12/1980 | Raney, Jr. | 340/731 |
| 4,254,409 | 3/1981 | Busby | 340/731 |
| 4,254,416 | 3/1981 | Lelke | 340/728 |
| 4,275,450 | 6/1981 | Potter | 358/77 X |
| 4,282,550 | 8/1981 | Coviello | 358/287 X |
| 4,302,776 | 11/1981 | Taylor et al. | 358/138 X |
| 4,356,482 | 10/1982 | Oguchi | 340/731 |

Primary Examiner—Robert L. Richardson
Attorney, Agent, or Firm—J. T. Cavender; Albert L. Sessler, Jr.

[57] ABSTRACT

A system is provided for reducing the total information contained in an image in order to reduce the size of the image. In an image comprising a number of lines, each line including a plurality of dots, first reduction means deletes data representing a predetermined proportion of dots spaced at regular intervals along each line, during the storage of said data in a storage device comprising part of the system. Second reduction means deletes data representing a predetermined proportion of the total lines of the image during the output of the data representing the lines from the storage device of the system.

19 Claims, 27 Drawing Figures

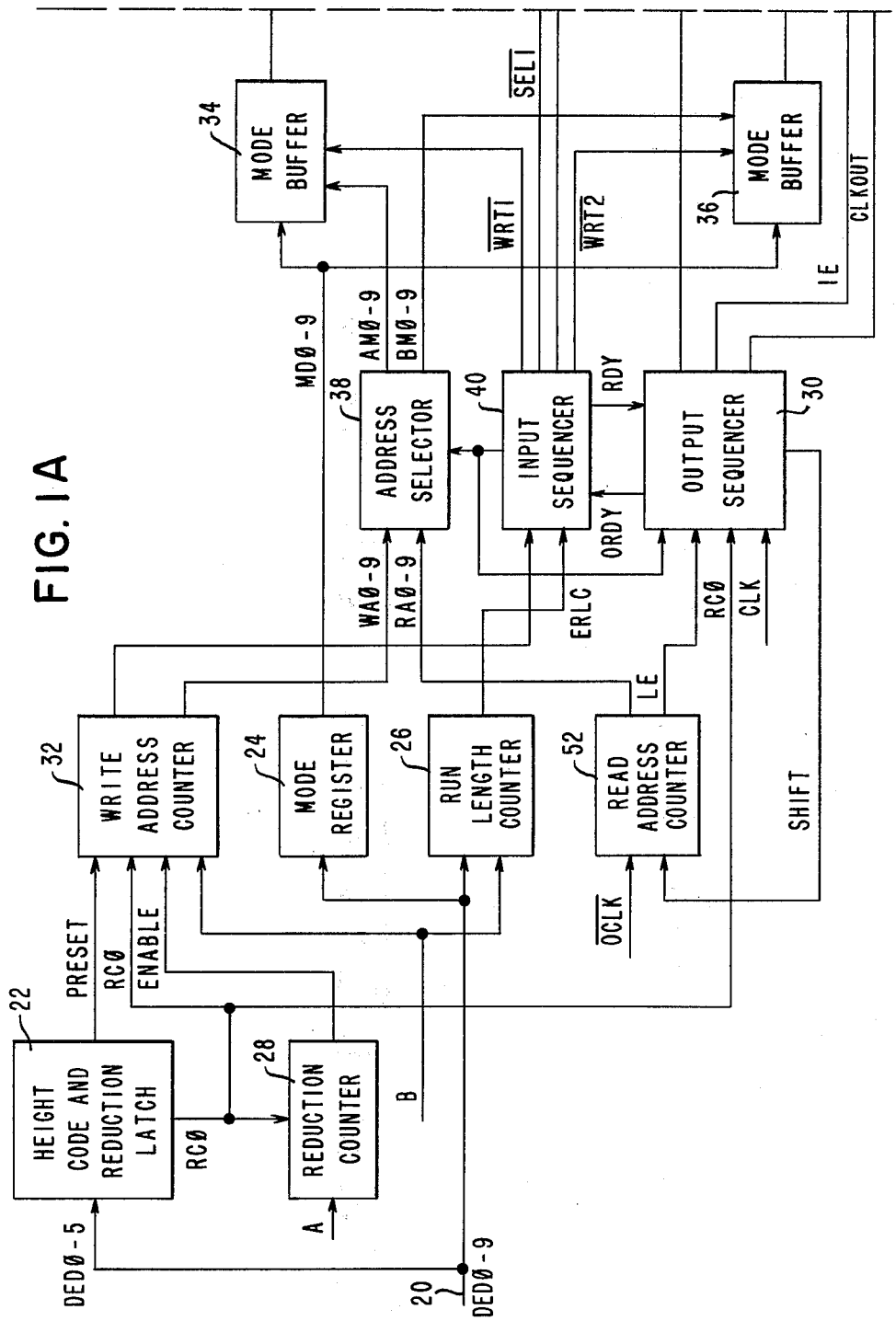
FIG. IA

FIG. 2A

RICHARD E. FITZWATER
3719 CALIFORNIA AVE
DAYTON, OHIO 45429

143

19___   56-2 / 422

PAY TO THE
ORDER OF _____ $ _____

_____ DOLLARS

THIRD NATIONAL BANK

MEMO _____

RICHARD E. FITZWATER
3719 CALIFORNIA AVE
DAYTON, OHIO 45429

143

19___   56-2 / 422

PAY TO THE
ORDER OF _____ $ _____

_____ DOLLARS

THIRD NATIONAL BANK

MEMO _____

⑆234567898⑆ 1234578⑆    ⑈0000000004⑈

IMAGE REDUCTION SYSTEM

BACKGROUND OF THE INVENTION

This invention relates to apparatus for reducing the size of an electronically transmitted image.

In a number of business applications, it has become desirable to reduce image size in order to produce a display, or a print-out, which may be smaller in size than the original image. Image size reduction may be desirable or necessary in view of the size of a display device screen, or in view of the necessity for placing a plurality of images on a single display. In certain of the applications, such as the display of a check or other document in a bank document processing system, not all of the information contained in the original image is essential for the reproduction of an image which provides sufficient detail for the purpose required, such as signature comparison or amount verification, even though some of the original information has been lost. The deletion of such non-essential information may be the most efficient and economical way to achieve the desired image size reduction.

SUMMARY OF THE INVENTION

The present invention provides an apparatus for reduction of electronically transmitted images by deleting data from the image information according to predetermined arrangements in each of two dimensions.

In accordance with one embodiment of the invention, image reduction apparatus for deleting portions of image representations comprises storage means for storage of information used to form an image, output means coupled to said storage means for outputting image information to a utilizing device, data input means for supplying data to be entered into said storage means, data reduction means for causing the selective elimination of data to produce a reduced data image representation, first means controlled by said data reduction means to cause a selective first elimination of data during data storage in said storage means, and second means controlled by said data reduction means to cause a selective second elimination of data during transfer of said data from said storage means to said output means.

It is accordingly an object of the present invention to provide a novel and efficient apparatus for size reduction of electronically transmitted images.

A further object is to provide apparatus for deletion of both dot information and line information in an image representation which includes a plurality of parallel lines, each of which includes a plurality of dots.

A further object is to provide image reduction apparatus in which certain information is deleted during storage of the image information in a storage means, and in which certain other information is deleted during the read-out and transfer of image information from the storage means to a utilizing device.

With these and other objects, which will become apparent from the following description, in view, the invention includes certain novel features of construction and combinations of parts, one form or embodiment of which is hereinafter described with reference to the drawings which accompany and form a part of this specification.

BRIEF DESCRIPTION OF THE DRAWINGS

FIGS. 1A and 1B, taken together, constitute a block diagram of the image reduction system of the present invention.

FIG. 2A shows an unreduced image of a typical document.

FIG. 2B shows an image of the document of FIG. 2A which has been reduced in size in accordance with the present invention.

DETAILED DESCRIPTION

Referring now to FIGS. 2A and 2B of the drawings, there are shown two illustrative images of the same document, before and after the image reduction performed in accordance with the teachings of the present invention. In the illustrated embodiment of the invention, a four-to-three reduction in both coordinate directions is employed to produce the image of FIG. 2B. However, it would be obvious to employ a different ratio of image reduction if desired.

The unreduced image 14 of FIG. 2A may be thought of as including a total number of X vertical lines, each of said lines including a total number of Y elements or dots. In the reduced image 16 of FIG. 2B, a total number of ($\frac{3}{4}$)X vertical lines of image elements are present, with a total number of ($\frac{3}{4}$)Y elements or dots being included in each line. It will be seen that the reduced number of lines and the reduced number of elements per line in FIG. 2B is consistent with the previously-described four-to-three reduction ratio.

Figure 3:
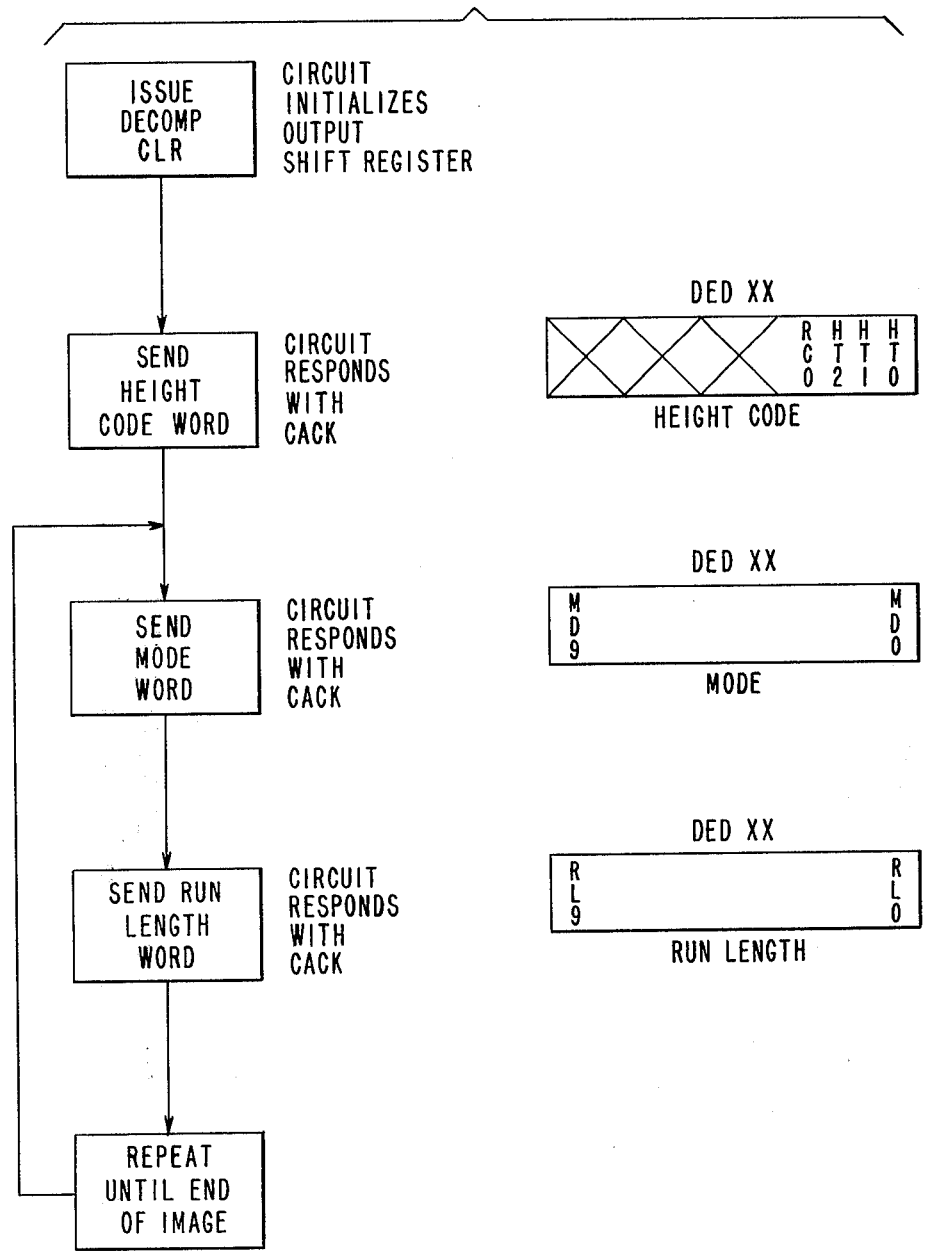
FIG. 3 is a diagram showing a preferred sequence and format in which image data is provided to the system of the present invention.

Image information is received by the system on input 20 of FIG. 1A in the form of ten parallel signals designated DED0-9. These signals are applied in message groups which include "mode" information, "run length" information and "height code" information. FIG. 3 is a diagram showing the message format. In the illustrated embodiment, the mode information consists of ten-bit increments, representing ten dot positions in ten parallel image lines DED0-9. The mode information may be all "black" (or all dots present), all "white" (or all dots missing), or some combination of dots and blank spaces. The presence of an element could indicate, for example, a black image dot, though it could obviously also indicate another color, or the absence of a dot. The run length information appears on the same lines DED0-9 and provides the number of exact mode repetitions present in that portion of the image. When a mode change takes place, new mode information and run length information are provided to the system for generation of the next portion of the image. The height code information appears on lines DED0-5 and establishes the portion of the total number of positions (640 total in the illustrated embodiment) that are used in the particular image being processed through the system.

From the input 20, signals DED0-5 are applied to a height code and reduction latch 22, while signals DED-0-9 are applied to a mode register 24 and a run length counter 26. It will be recognized that different segments of a total input message are utilized at different times by the mode register 24 and the run length counter 26.

The height code and reduction latch 22 decodes the height code information contained in signals DED0-4, and ascertains from signal DED5 whether or not there is to be an image reduction in connection with the data being processed. If there is to be such a reduction, a signal RC0 is sent to a reduction counter 28, a write address counter 32, and an output sequencer 30.

The reduction counter 28 is clocked by a phase A clock and provides an output signal ENABLE which is applied to a write address counter 32. During an image reduction operation, the reduction counter 28 repetitively counts through a predetermined number of counts. When no reduction of image data is to take place, the signal RC0 is low, the reduction counter 28 does not count, and the ENABLE signal from reduction counter 28 to write address counter 32 remains high.

However, when an image reduction is to take place, the ENABLE signal is caused by the reduction counter 28 to go to a low state for one count out of a predetermined total number. In the illustrated embodiment, the ENABLE signal goes to a low state for one count out of each four counts generated by the reduction counter 28.

The signals DED0-4 cause the height code and reduction latch 22 to provide PRESET signals to the write address counter 32, which is capable of counting to a maximum count of 640 in the illustrated embodiment. The function of the PRESET signals is to cause the write address counter 32 to start with an address greater than zero, so that the reduced amount of data to be applied to system storage, which comprises mode buffers 34, 36, will be maintained in the proper phase relationship for readout and application to a utilizing device. Thus, if the total storage capacity for a line of data in the buffers 34, 36 is 640 dots, and there is a 4:3 reduction, only 480 dots per line will actually be stored. Therefore, the addresses provided by the write address counter should commence with the equivalent of address number 160. The PRESET signals in the illustrated embodiment may be set in 32-count increments, so that a signal value which is the equivalent of 5 ($5 \times 32 = 160$) is provided by the signals DED0-4. Each of the mode buffers 34 and 36 is ten lines or columns wide. In the system of the illustrated embodiment of the present invention, the two mode buffers 34, 36 are considered as one buffer, twenty lines wide, for the purpose of data reduction. Therefore, when a data reduction is to be accomplished, lines 3 and 7 of buffer 34 and lines 1, 5 and 9 of buffer 36 will be deleted, for a total of five deletions out of twenty lines.

The write address counter 32 is clocked by a phase B clock, which is of the same frequency as the phase A clock applied to the reduction counter 28, but which is displaced in phase from the phase A clock. The write address counter 32 provides a series of ten-bit addresses designated WA0-9 to an address selector 38, and also provides an end-of-count signal EWC, which changes state when count 640 is reached, to an input sequencer 40.

The function of the address selector 38 is basically to select one of the two mode buffers 34, 36 for storage and to transmit the address from the write address counter 32 to the selected buffer 34 or 36.

Ten bits of mode information MD0-9 from the mode register 24 are applied to the selected mode buffer 34 or 36 concurrently with the corresponding address from the address selector 38. The mode register 24 functions essentially as a latch to hold until needed the mode information DED0-9, applied to the register 24 from the input 20.

The mode buffers 34, 36 each have a capacity of $10 \times 640$ bits, in the illustrated embodiment, so that in effect they are able to store at one time an image "slice" which is ten lines wide, with each line containing up to 640 dots. Each address is ten bits wide and thus stores the mode information MD0-9 for a corresponding dot position in each of ten parallel lines.

When the ENABLE signal from the reduction counter 28 to the write address counter 32 changes state, the address counter is not incremented. Accordingly, the next mode word MD0-9 from the mode counter is stored at the same address as the previous mode word. The previous mode word is thereby written over and lost, accomplishing the desired mode word data reduction.

The run length counter 26 has entered therein from the input 20 a signal DED0-9 indicative of the number of repetitions of corresponding mode information entered in the mode register 24. The phase B clock is used to clock the run length counter 26 and decremented from the count to which it was set by the run length signal DED0-9. When the counter 26 has been decremented to zero, a signal ERLC which signifies the end of the run length counter, is applied from said counter to the input sequencer 40.

The mode buffers 34 and 36 function in a manner similar to that described for corresponding storage units in the co-pending U.S. patent application Ser. No. 200,168, filed Oct. 24, 1980, inventor Keith L. Kenyon, now U.S. Pat. No. 4,378,594, issued Mar. 29, 1983, and assigned to the assignee of the present application. Both of these buffers may have information stored therein and subsequently read out, and the use of two buffers enables a readout of one to be carried on during the time that information is being stored in the other.

The input sequencer 40 selects one of the buffers 34 or 36 for the writing of information therein by means of the signals $\overline{WRT1}$ and $\overline{WRT2}$, and is controlled by the previously-mentioned signals EWC and ERLC, as well as a signal ORDY from the output sequencer 30. Control by the input sequencer 40 is also exercised by means of signals $\overline{SEL1}$ and $\overline{SEL2}$ over data selectors 42, 44 (FIG. 1B), which are employed in the reading out of data from the mode buffers 34, 36, as will subsequently be described.

When writing into the selected buffer 34 or 36 has been completed, and that buffer is full, as indicated to the input sequencer 40 by the signal EWC from the write address counter 32, the two buffers are "switched" or "rotated", so that writing into the other buffer may now commence, while reading out of the buffer just filled may also take place. This "switching" is controlled by the signals $\overline{WRT1}$, WRT2, $\overline{SEL1}$ and $\overline{SEL2}$.

It will be noted that the output sequencer 30 and the input sequencer 40 communicate their condition to each other by means of the signals RDY and ORDY.

Reading out of data from a selected buffer 34 or 36 is accomplished by means of the corresponding data selector 42 or 44. The information read out from the selected mode buffer 34 or 36 by its data selector 42 or 44 passes through an OR gate 46 (FIG. 1B) and is entered into an output shift register 48, from where it may be applied over an output 50 to a suitable utilizing device, such as a CRT, or a printer, or to a buffer for storing the complete image until called for.

As previously described, data is stored in the mode buffers 34 and 36 in an arrangement corresponding to ten lines or columns of 640 elements or dots each. Data readout in the illustrated embodiment of the present invention is on a line-by-line basis, with each dot or element of the selected line being read out serially by the data selector 42 or 44 through the OR gate 46 to the output shift register 48.

One line or column at a time is selected for readout by the output sequencer 30, which controls the selected data selector for line selection by means of the signals OSEL0-3. It will be seen that these four signals provide sufficient information to enable one of the ten lines in the selected mode buffer to be chosen for readout.

Addresses 0–639 for the reading out of the selected dot or element of the selected line are determined by the read address counter 52 which applies address signals RA0-9 to the address selector 38, which in turn provides address signals AM0-9 or BM0-9 to the selected mode buffer 34 or 36.

The operation of the read address counter 52 is controlled by a clock signal $\overline{OCLK}$ and by a signal SHIFT from the output sequencer 30. It provides a signal LE to the output sequencer 30 to indicate when a count of 640 has been reached, to cause the output sequencer to increment the OSEL0-3 address signal to the next line address.

Line deletion for image reduction is accomplished through control of the output shift register 48 by a signal CLKOUT from the output sequencer 30, which also supplies an input enable signal IE to the output shift register 48. In the illustrated embodiment of the invention, with image reduction operating, and signal RC0 controlling the output sequencer 30, during the read-out of every fourth line contained in the mode buffers 34 and 36, the output shift register 48 is disabled by the signal CLKOUT, so that the line information being received from data selector 42 or 44 at that time is simply not stored in the register 48, and is thus lost and effectively deleted from the image. of course, if the image reduction feature is not operative, there will be no disabling signal CLKOUT to the register 48 and the complete image will pass over the output 50 without reduction.

The output sequencer 30 is, in the illustrated embodiment of the present invention, comprised of a field programmable logic array, and the manner in which it functions under control of the various input signals applied to it may best be understood by reference to the flow diagram of FIGS. 4A–4F inclusive. The output sequencer 30 is driven by a clock signal CLK and increments through a total of eleven states during a complete cycle, with the states changing upon receipt of each clock edge. States 2–11 correspond respectively to the columns or lines 0–9 stored in the two mode buffers 34 and 36. These columns are read out when the output sequencer 30 is in a corresponding state during an output operation. In each of the rectangular blocks designated by a state number in the flow diagram, the signals listed there are in an active condition.

Figure 4A:
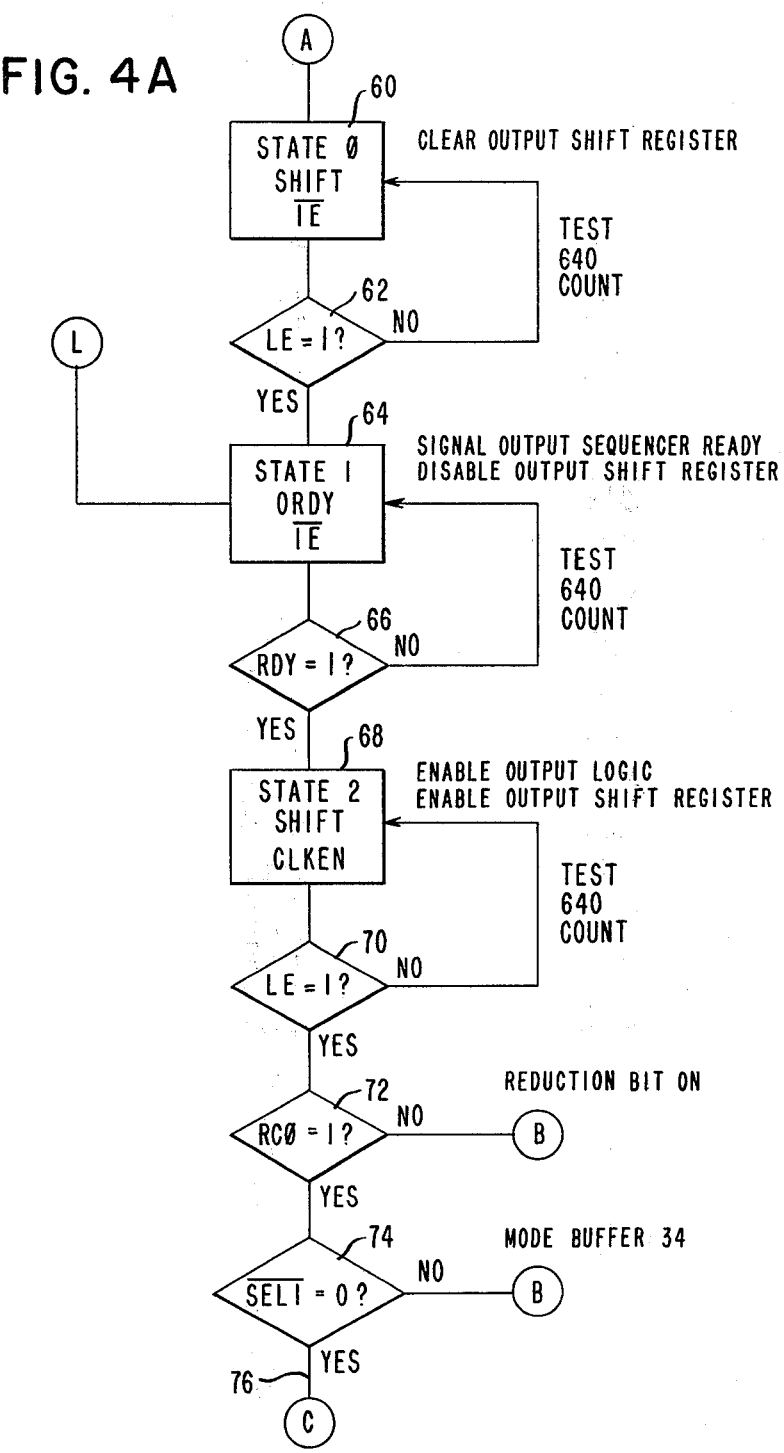
FIGS. 4A-4F inclusive, taken together, constitute a flow diagram of the sequential operation of the output sequencer which forms a part of the present invention.

At the top of the flow diagram of FIG. 4A, the circled letter A represents an initialized, or reset, condition of the output sequencer 30, which can also be defined as state 0, shown in block 60. In that state, the signal SHIFT is active and the input enable signal IE is inactive. The output shift register 48 must be cleared, or initialized, before the output sequencer 30 can advance to state 1. This is accomplished by shifting the register 48 through 640 counts, so that all locations are assured to be set to 0. The count is tested by a determination in decision block 62 as to whether signal LE is equal to 1. When signal LE assumes a value represented by 1, the output sequencer 30 advances to state 1, as shown in block 64, in which the ready signal ORDY applied from the output sequencer 30 to the input sequencer 40 is active, and the input enable signal IE is inactive. The output shift register 48 is disabled during state 1.

The output sequencer 30 remains in state 1 until the input sequencer 40 has completed writing into, and filling, a selected one of the mode buffers 34 or 36. When the buffer has been filled, the count of the write address counter 32 will have reached 640, and the ready signal RDY from the input sequencer 40 to the output sequencer 30 will become active. This is tested in decision block 66, where the equivalence of RDY to 1 causes the output sequencer 30 to advance to state 2, in which column 0 of the selected buffer 34 or 36 is read out.

In state 2, represented by block 68, the output signals from the output sequencer 30 change once more, to enable reading of column 0 of the selected mode buffer 34 or 36. The signal SHIFT becomes active, and the signal CLKEN then becomes active as a consequence. This enables the signal CLKOUT, which in turn enables the output shift register 48, as well as enabling the clock signal which is applied to the output logic.

In state 2, the equivalence of signal LE to 1 is tested in decision block 70. If LE is not equal to 1, the system continues to cycle in state 2 until a count of 640 is reached. From decision block 70, the process proceeds to decision block 72, in which the equivalence of the reduction bit signal RC0 to 1 is tested. If the reduction bit signal RC0 is not active (does not equal 1), indicating that no image reduction is to be done, the process continues from the circled B over process path 76 to state 3 in block 78 on FIG. 4B. If the reduction bit signal RC0 is active, indicating that an image reduction is to take place, the process continues to decision block 74, in which the equivalence of the selection signal $\overline{SEL1}$ to 0 is tested. If $\overline{SEL1}$ is equal to 1, mode buffer 34 is selected for readout; if $\overline{SEL1}$ is not equal to 1, mode buffer 36 is selected for readout. Equivalence of signal $\overline{\text{SEL1}}$ to 0 causes the process to continue from the circled C over path 80 in FIG. 4B, while the equivalence of $\overline{\text{SEL1}}$ to 1 causes the process to continue from the circled B over path 76 in FIG. 4B.

Figure 4B:
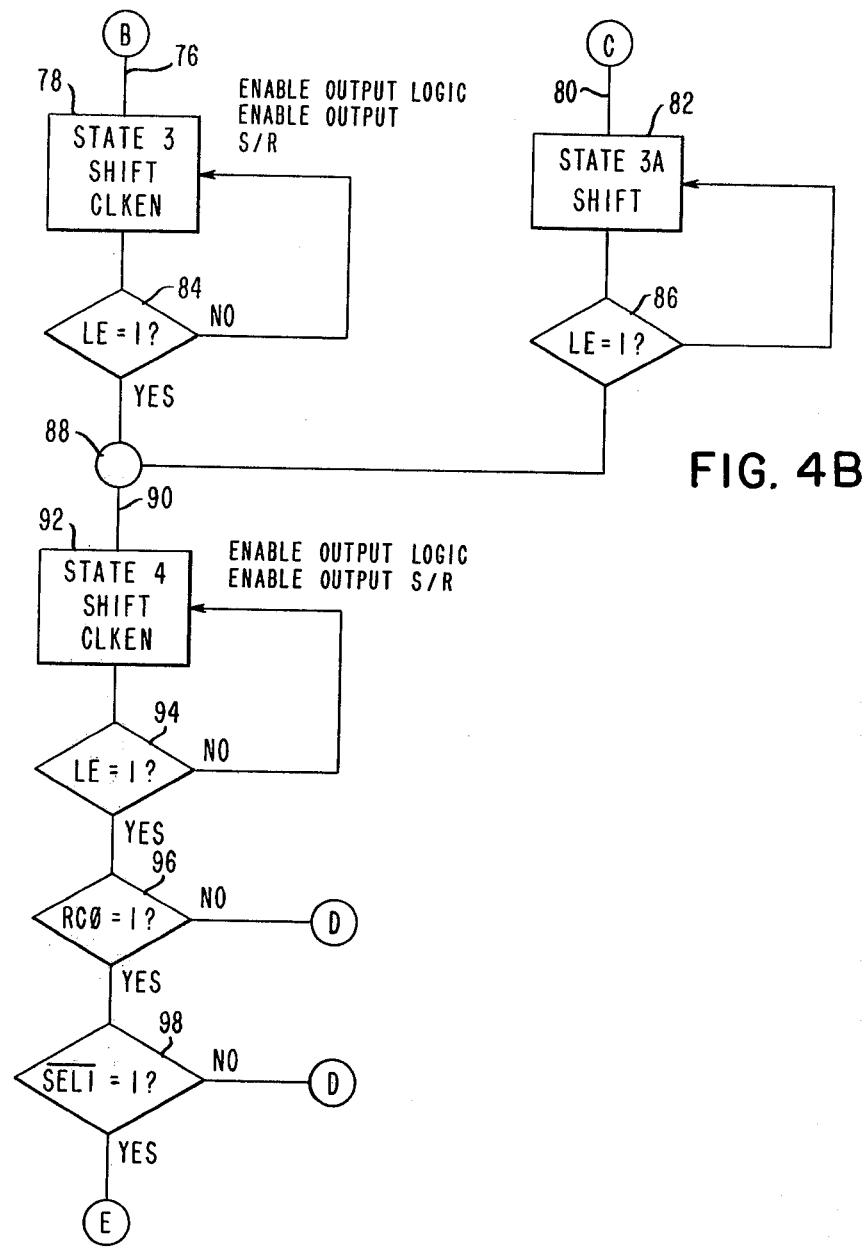

Referring now to FIG. 4B, the process path 76 which continues from the circled B extends to block 78, representing state 3. In this state, both the SHIFT and the CLKEN signals are active, so that the output logic and the output shift register 48 are both enabled. This state is employed whenever mode buffer 34 is selected for readout, and is also employed when mode buffer 36 is selected for readout and the data reduction operation does not take place.

However, when a data reduction operation does take place, and mode buffer 36 is selected, as determined by decision block 74 and 76, the process path 80 extends from circled C to block 82 (FIG. 4B), representing state 3A. This state is similar to state 3, except that only the signal SHIFT, and not the signal CLKEN, is enabled, so that the serial shift register 48 is enabled, but the output logic is not. As a consequence, data stored in the column 1 position in the mode buffer 36 is read out, but is not retained in the shift register 48, and is thus lost, which in effect provides the desired data reduction.

Both of the process paths 76 and 80 continue to identical decision blocks 84 and 86 in which the equivalence of the signal LE to 1 is tested. in both cases, the system loops until the read address counter 52 has counted to 640 and the signal LE then becomes equal to 1. The two branch paths 76 and 80 then join at point 88 to a single process path 90 which leads to block 92, representing state 4, in which the signals SHIFT and CLKEN are active, enabling the output logic and the serial shift register 48, and in which column 2 of the selected mode buffer 34 or 36 is read out. It will be noted that column 2 of either of the buffers 34, 36 is not one of the columns to be deleted during a data reduction operation, and accordingly there is no need for a state 4A.

In state 4, the equivalence of the signal LE to 1 is tested in decision block 94. If LE is not equal to 1, the system continues to cycle in state 4 until a count of 640 is reached. From decision block 94, the process proceeds to decision block 96, in which the equivalence of the reduction bit RC0 to 1 is tested. If the reduction bit signal RC0 is not active, indicating that no image reduction is to be done, the process continues from the circled D over path 100 to state 5 in block 102 on FIG. 4C. If the reduction bit signal RC0 is active, indicating that an image reduction is to take place, the process continues to decision block 98, in which the equivalence of the selection signal $\overline{\text{SEL1}}$ to 1 is tested. If $\overline{\text{SEL1}}$ is equal to 1, mode buffer 34 is selected for readout; if $\overline{\text{SEL1}}$ is equal to 0, mode buffer 36 is selected for readout. Equivalence of $\overline{\text{SEL1}}$ to 1 (decision of "no") causes the process to continue from the circled D over path 100 in FIG. 4C, while the equivalence of $\overline{\text{SEL1}}$ to 1 causes the process to continue from the circled E over path 104 in FIG. 4C.

Figure 4C:
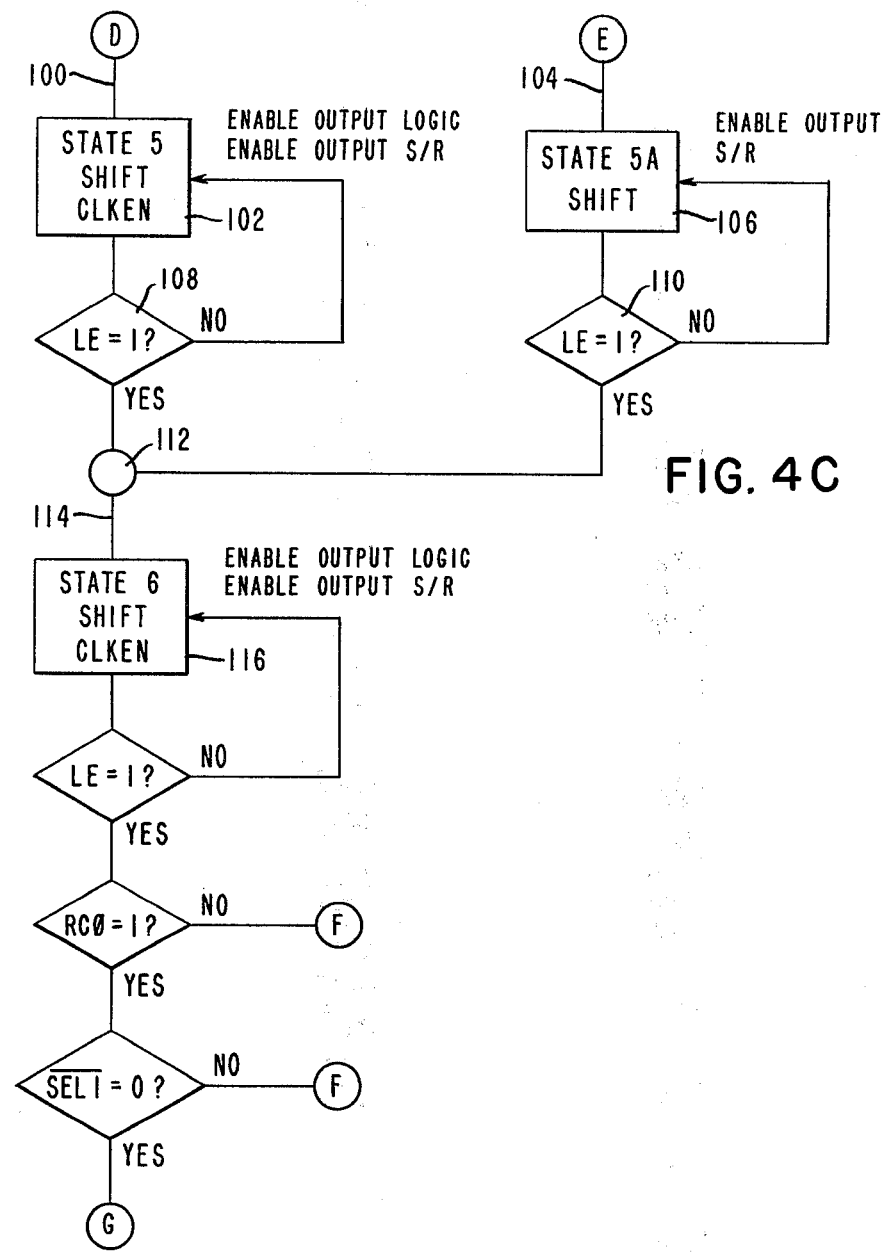
Figure 4D:
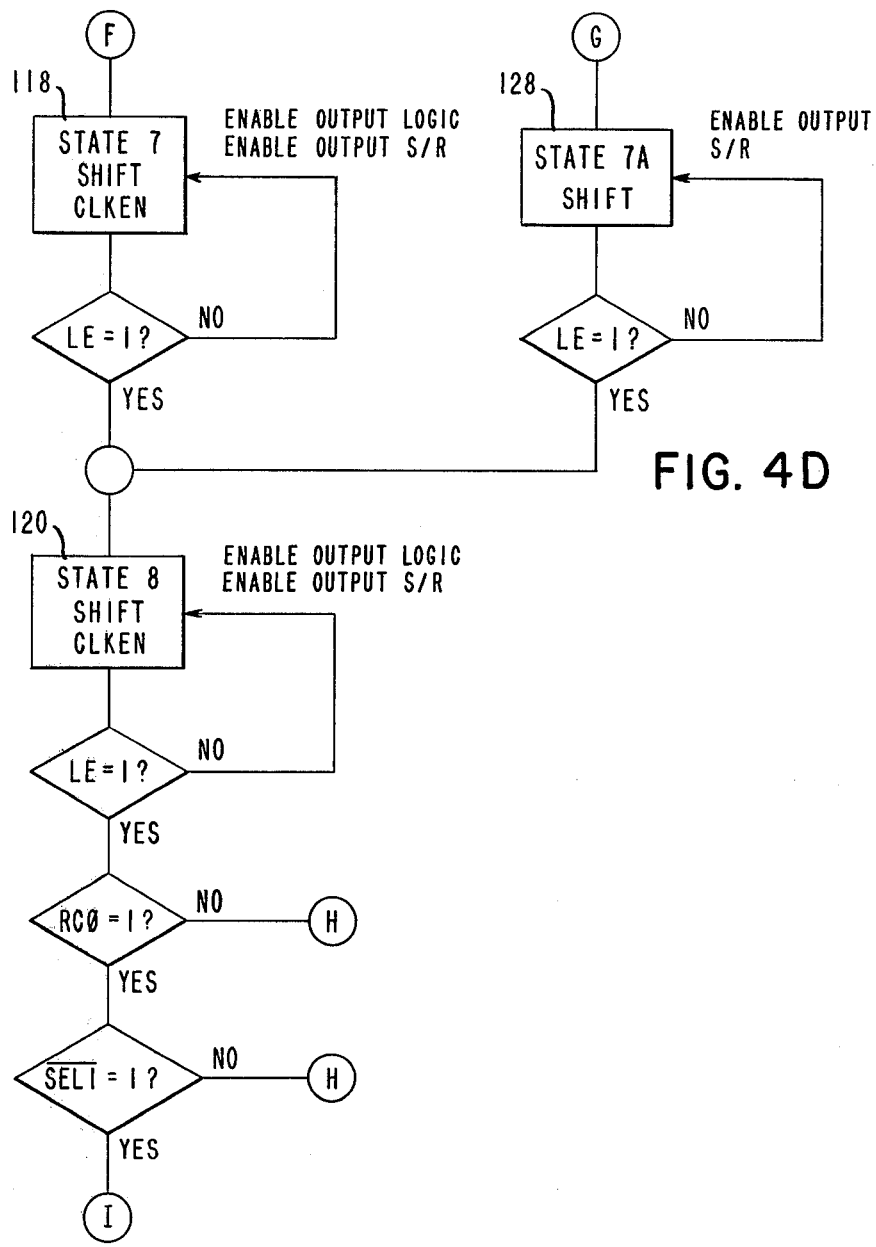
Figure 4E:
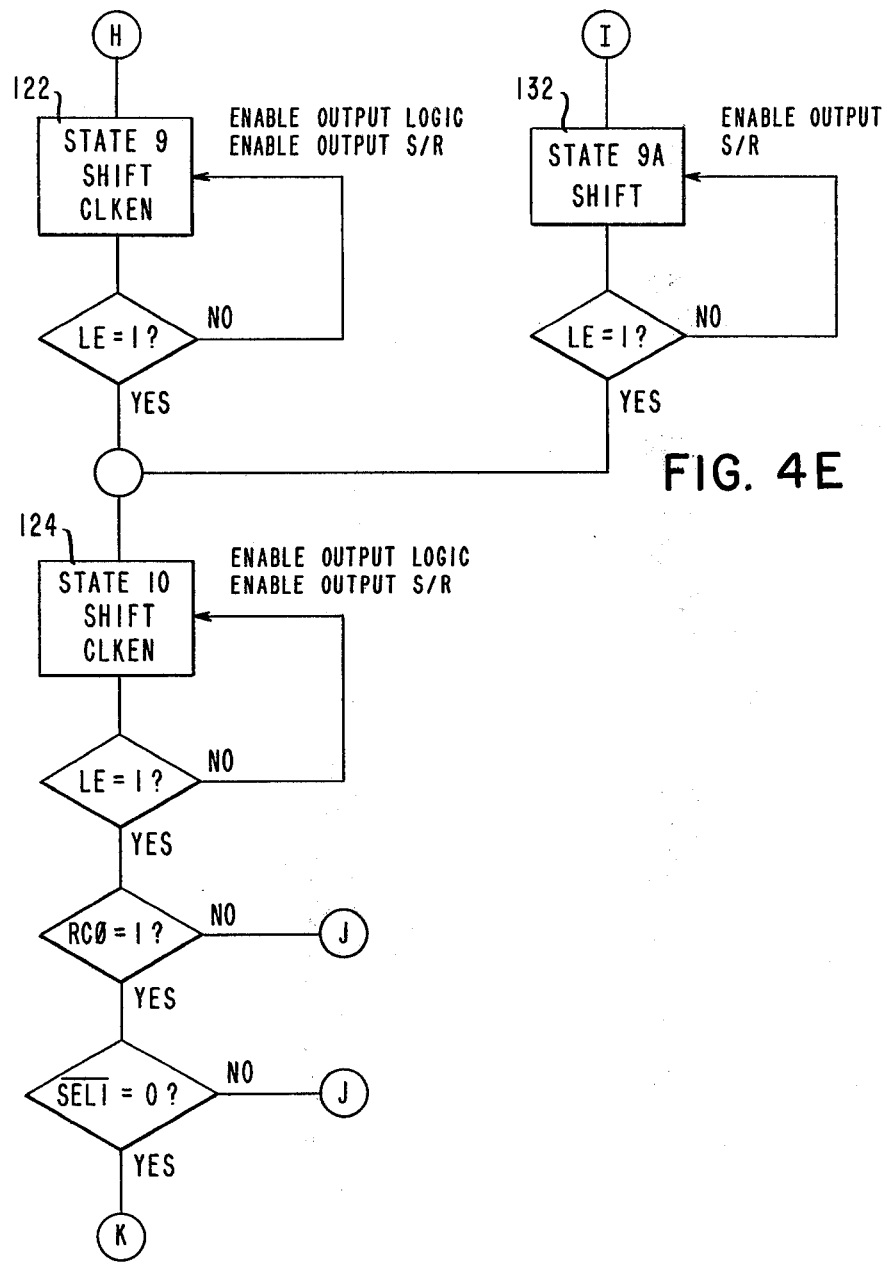

Referring now to FIG. 4C, the process path 100 which continues from the circled D extends to block 102, representing state 5. In this state, both the SHIFT and the CLKEN signals are active, so that the output logic and the serial shift register 48 are both enabled. This state is employed whenever mode buffer 36 is selected for readout, and is also employed when mode buffer 34 is selected for readout and data reduction does not take place.

However, when data reduction does take place, and mode buffer 34 is selected, as determined by decision blocks 96 and 98, the process path 104 extends from circled E to block 106 (FIG. 4C), representing state 5A. This state is similar to state 5, except that only the signal SHIFT and not the signal CLKEN is enabled, so that the serial shift register 48 is enabled, but the output logic is not. As a consequence, the data stored in the column 3 position in the mode buffer 34 is read out, but is not retained in the shift register 48, and is thus lost, which in effect provides the desired data reduction.

Both of the process paths 100 and 104 continue to identical decision blocks 108 and 110, in which the equivalence of the signal LE to 1 is tested. In both cases, the system loops until the read address counter 52 has counted to 640, and the signal LE becomes equal to 1. The two branch paths 100 and 104 then join at point 112 to a single process path 114 which leads to block 116, representing state 6, in which the signals SHIFT and CLKEN are active, enabling the output logic and the serial shift register 48 and in which column 4 of the selected mode buffer 34 or 36 is read out. It will be noted that column 4 of either one of the buffers 34, 36 is not one of the columns to be deleted during a data reduction operation.

The remainder of the operation of the output sequencer 30, as illustrated in the flow diagram of FIGS. 4A–4F inclusive, is essentially repetitive of the portion which has been described above. The sequencer 30 passes through states 6–11 inclusive, represented by blocks 116, 118, 120, 122, 124 and 126, respectively, for reading out of corresponding columns or lines 4–9 inclusive of the selected mode buffer 34 or 36. When the data reduction bit RC0 is active, and the appropriate mode buffer is being read out, so that data reduction takes place, the output sequencer 30 enters states 7A, 9A and 11A, represented by blocks 128, 132 and 136, respectively, rather than the corresponding states 7, 9 and 11, so that the data contained in column 7 of mode buffer 34 and the data contained in columns 5 and 9 of mode buffer 36 is lost.

Figure 4F:
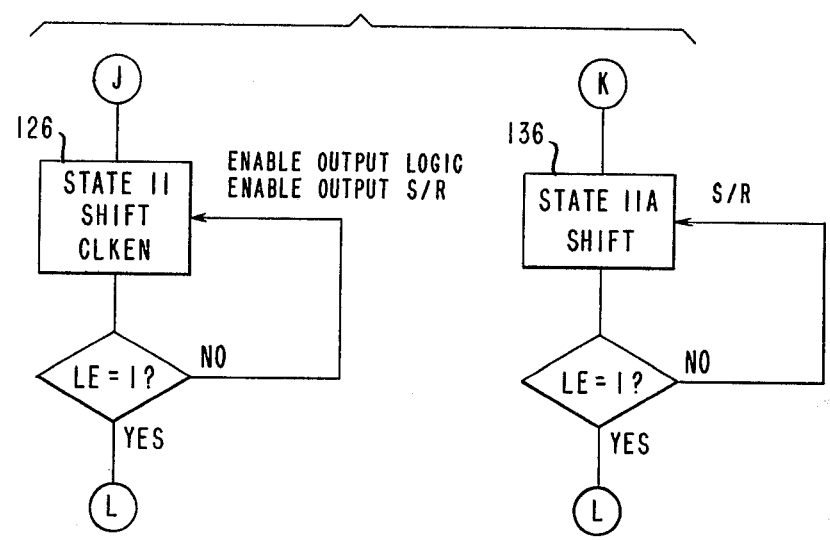

As shown in FIG. 4F, the two paths which include states 11 and 11A, represented by blocks 126 and 136, respectively, both are connected through the circled L connection back to FIG. 4A, state 1, block 64, from whence the system may commence another operating cycle when the proper inputs to the output sequencer 30 are present.

Figure 1B:
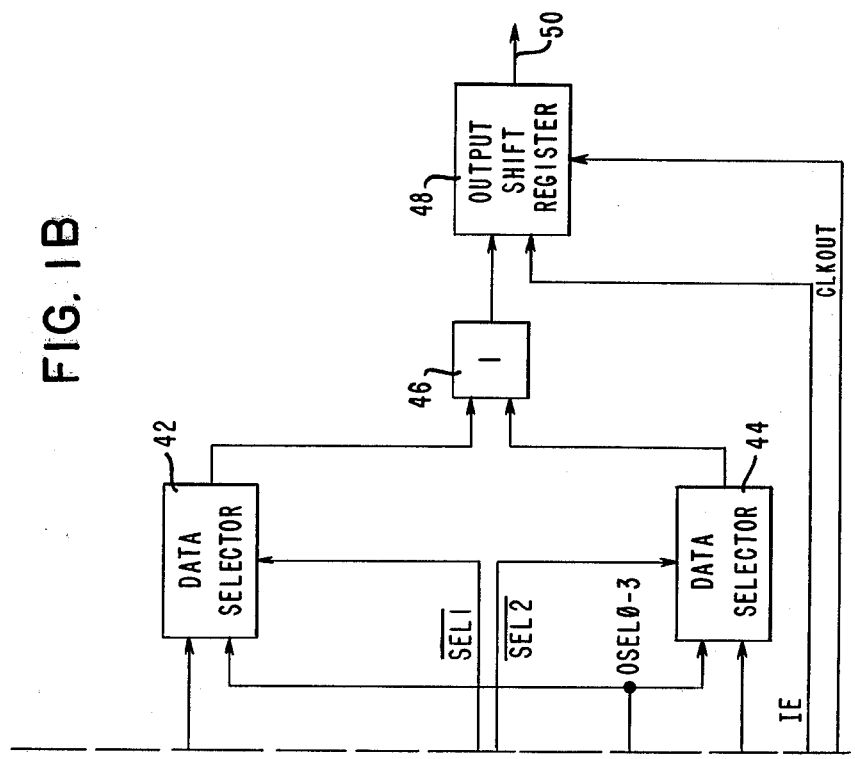

The system, as configured in the block diagram of FIGS. 1A and 1B, may be implemented by the employment of any suitable combination of electrical components. One such combination is shown in the detailed circuit diagrams of FIGS. 5A, 5B, 6A, 6B, 6C, 7A, 7B, 8A, 8B, 9A, 9B, 10A, 10B, 11A and 11B.

The general sequence of system operation followed in the illustrated embodiment shown herein for each segment of image data to be processed is shown in the diagram of FIG. 3. The system is first reset by a signal applied externally, which is applied as signal $\overline{\text{RES}}$ to the output sequencer 30. Height code and reduction data are next applied to the height code and reduction latch 22. Next an initialization of the memory is carried out, followed by the loading of mode data into the mode register 24, and then the loading of run length data into the run length counter 26.

Figure 5A:
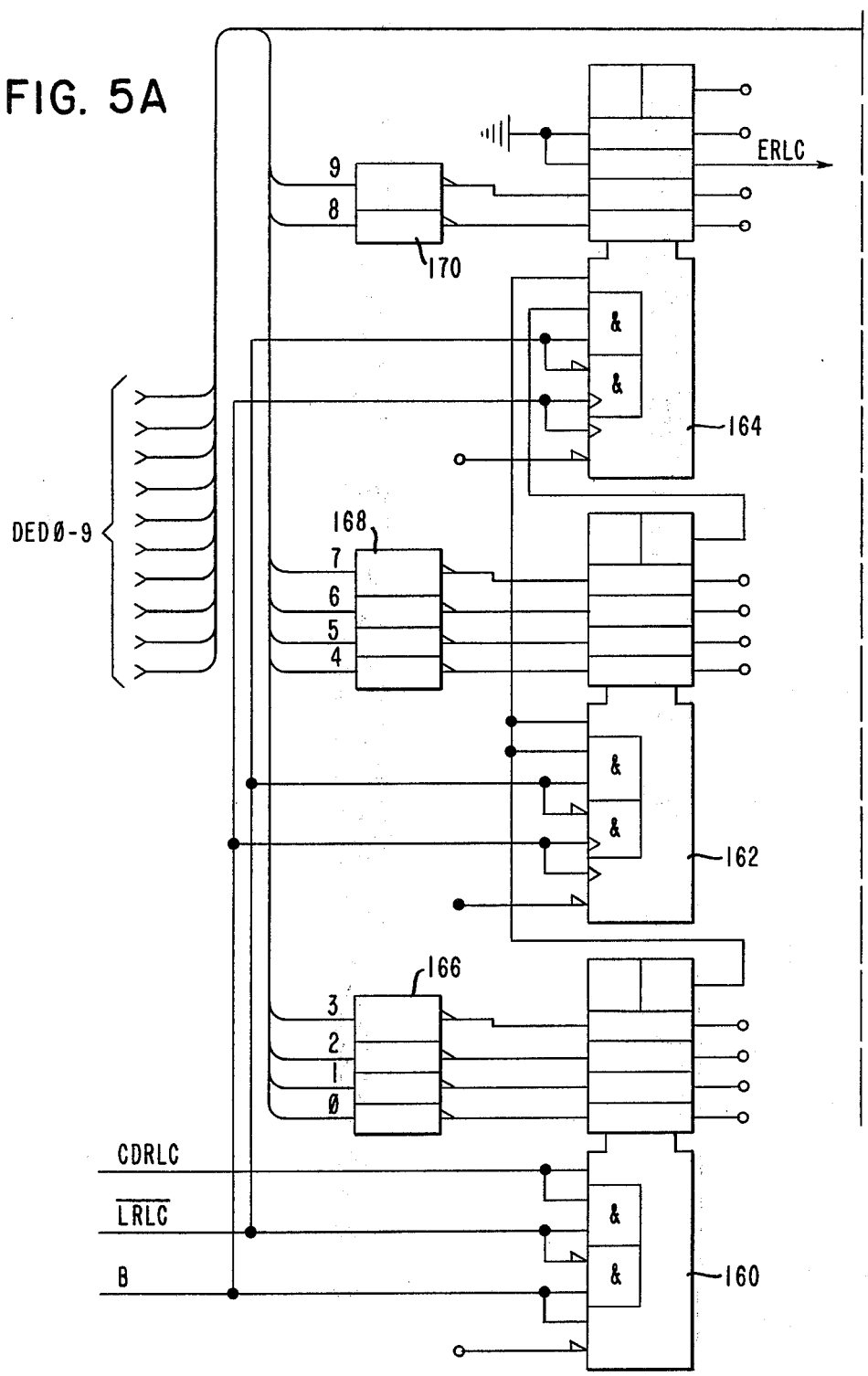
FIGS. 5A and 5B, taken together, constitute a circuit diagram showing the run length counter, the height code and reduction latch, and the mode register circuits for the system of the present invention.

Referring now to FIG. 5A, shown there is the detailed circuitry for the run length counter 26. This counter comprises three individual counters 160, 162 and 164, which may be of type 74LS161, together with three inverters 166, 168 and 170, which may be of type 74LS04. Input lines DED0–9 are connected to the inverters, with lines 0, 1, 2, 3 being applied to inverter 166, lines 4, 5, 6, 7 being applied to inverter 168, and lines 8 and 9 being applied to inverter 170. The counters 160, 162 and 164 are connected serially, so that when counter 160 overflows, it increments the next higher counter 162, and so on.

The purpose of the run length counter 26 in the illustrated embodiment of the present invention is to count to 1024, which is the maximum number of mode repetitions in the illustrated embodiment, and at that point to send a signal ERLC (end of run length counter) to the input sequencer 40. The run length signal on lines DED0–9 provides the actual run length desired, and the inverters 166, 168 and 170 are therefore employed to provide to the counters a preset signal which is the complement, based upon a total count of 1024, of the run length number, so that the run length counter will commence counting at this preset number and count to 1024, with the number of actual counts being equal to the run length signal applied on lines DED0–9.

Loading of run length information into the counters 160, 162, 164 is controlled by the signal $\overline{LRLC}$ (load run length counter), from the input sequencer 40, going active. Clocking of the counters is controlled by the phase B clock signal B. The signal CDRLC applied to the counters 160, 162, 164 is an enabling signal which also comes from the input sequencer 40.

Figure 5B:
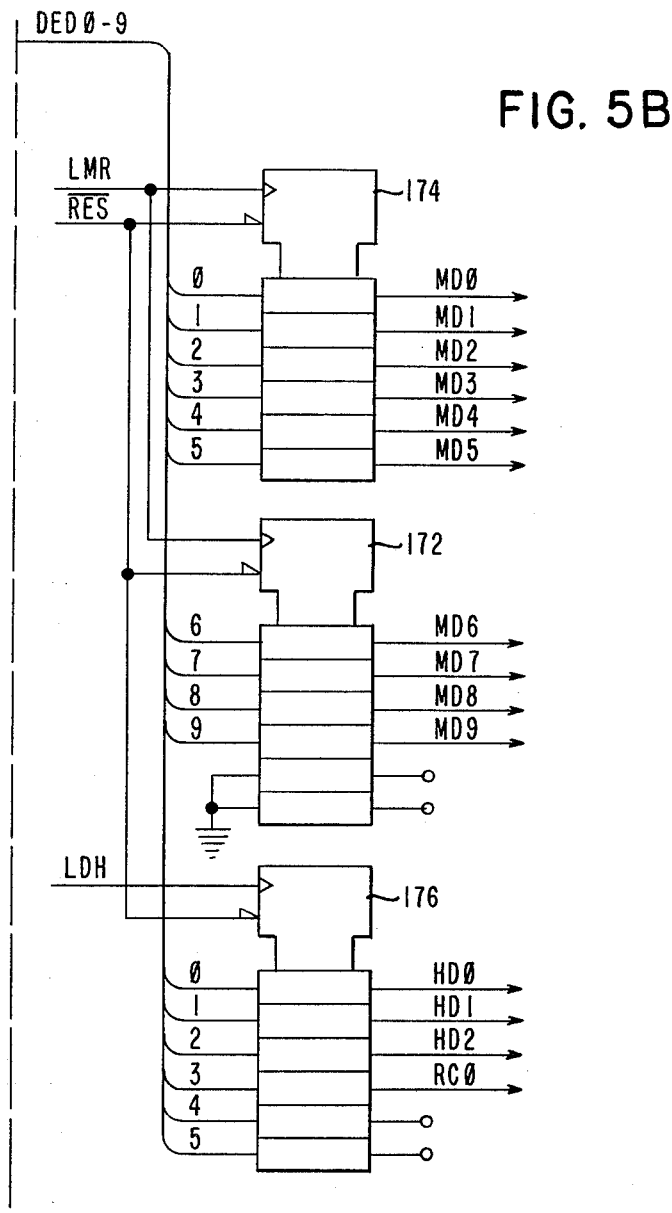

Shown in FIG. 5B is the detailed circuitry for the mode register 24. This register includes counters 172 and 174, which may be of type 74LS174. Input lines DED0–9 are connected to the counters 172 and 174, which function to store the mode information during the time of its use by the system. This information is output from the counters as signals MD0–9.

The registers 172 and 174 are clocked by the signal LMR from the input sequencer 40, and are reset by the signal $\overline{RES}$, which originates outside the system. The signal LMR is derived in response to the run length counter counting to its capacity, and is the initial step in loading a new mode and run length.

Also shown in FIG. 5B is the detailed circuitry for the height code and reduction latch 22. This latch comprises a counter 176, which may be of type 74LS174. Input lines DED0 to 5 are connected to the counter 176, which functions to store the height code information during the time of its use by the system. This information is output from the register 176 as signals HD0–2. The register 176 also provides the data reduction bit or signal RC0, which indicates whether or not a data reduction is to take place during the processing of a particular segment of image information by the system. A load height signal LDH from outside the system controls the loading of height code information, and the reset signal $\overline{RES}$ controls the resetting of the register 176.

Figure 6A:
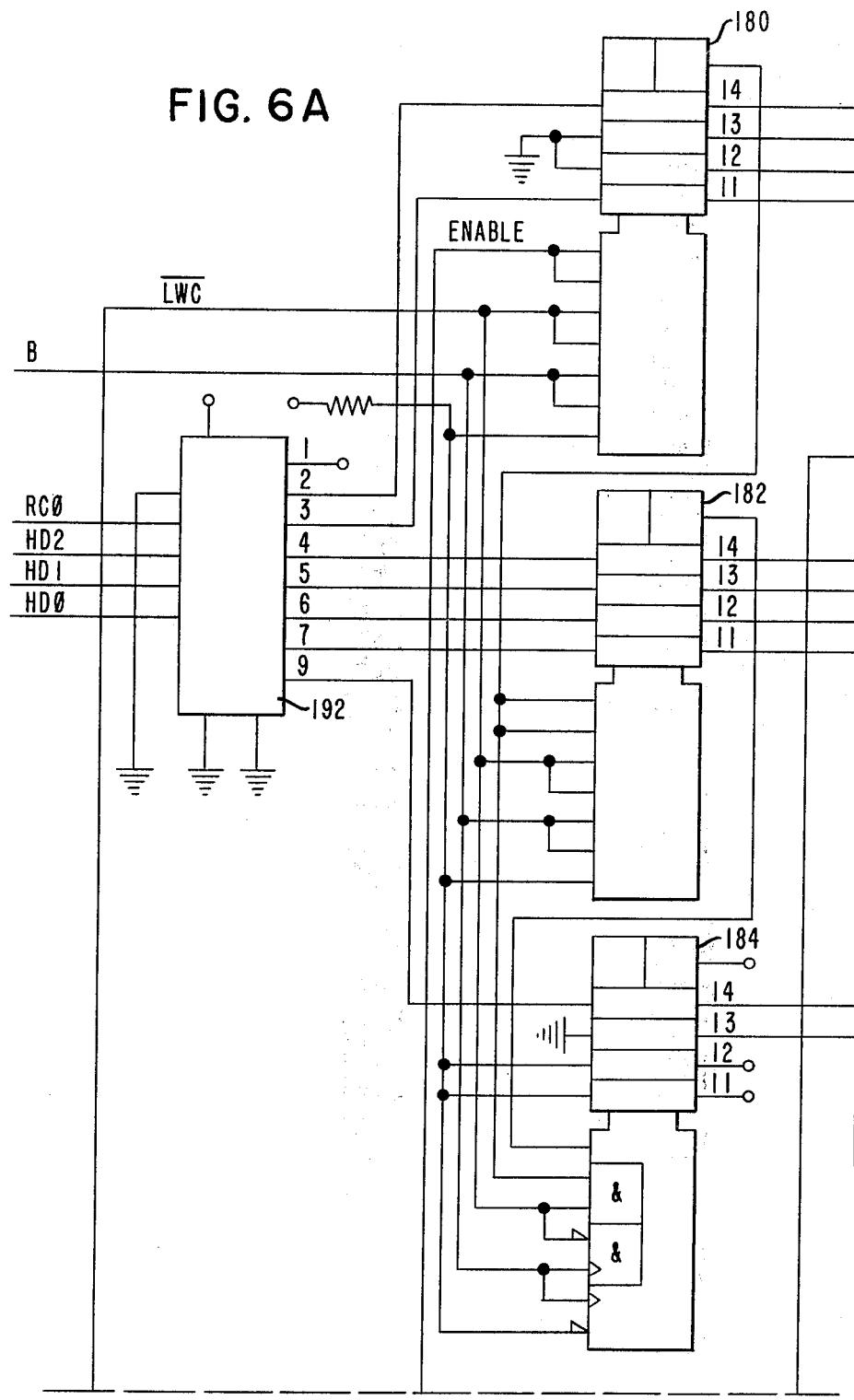
FIGS. 6A, 6B and 6C, taken together as shown in FIG. 6D, constitute a circuit diagram showing the write address counter and the reduction counter circuits for the system of the present invention.
Figure 6B:
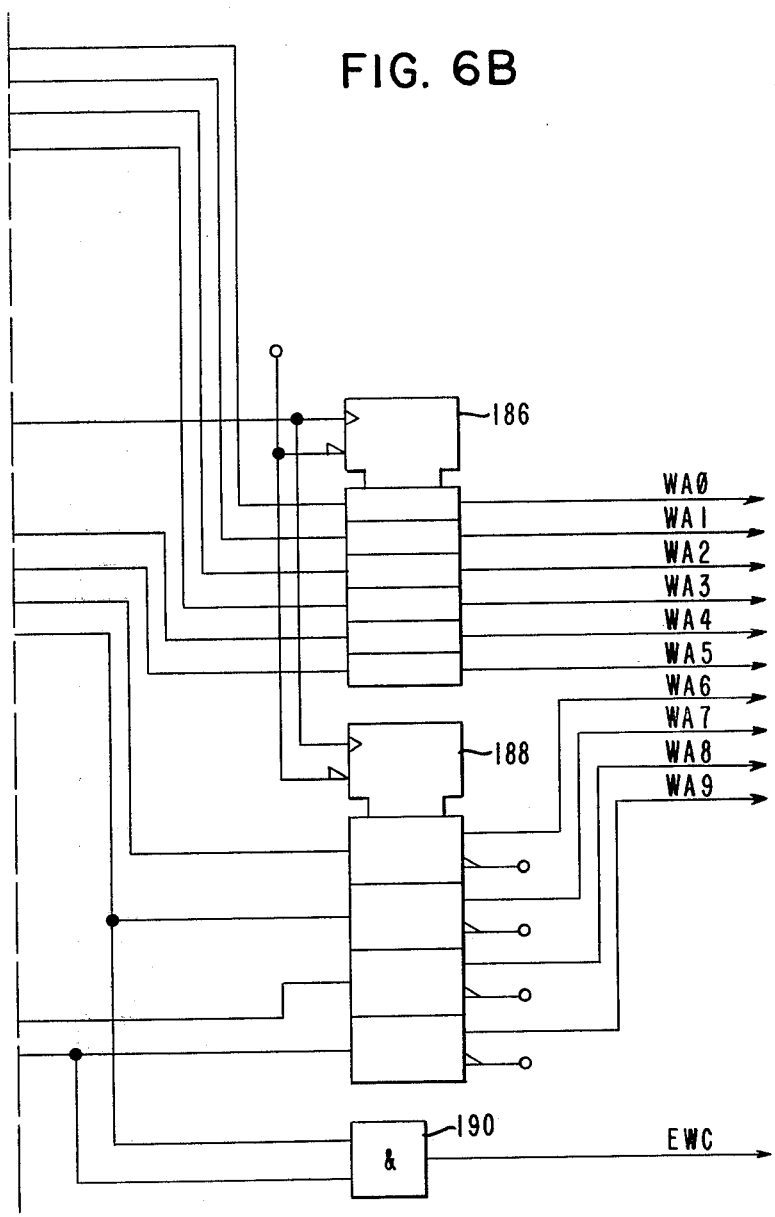

Referring now to FIGS. 6A and 6B, shown therein is the detailed circuitry for the write address counter 32, which includes three serially connected, or cascaded, counters 180, 182, and 184 which may be of type 74LS161; two registers 186, 188, which may be of type 74LS174 and 74LS175, respectively; an AND gate 190 which may be of type 74LS08; and a programmable read-only memory or PROM 192, which may be of type 82S123.

The lines HD0–2 and RC0 from the height code and reduction latch 22 are applied to the PROM 192, where the signals on said lines are decoded and applied to appropriate inputs of the counters 180, 182, 184, in order to provide preset values at which counting is commenced, thereby decreasing the total count which is output from said counters. In the illustrated embodiment, the maximum count is 640. Therefore, if the preset is 0, the count will be 640. If the preset value is 1, for example, the signal at output pin 5 of the PROM 192 is 1, with the other outputs at 0, and the counters will commence at a count of 32, with the first clock incrementing the counters to 33, so that the total number of counts will be 640 minus 32, or 608. It will be seen that the outputs of the PROM 192 are connected to two of the preset inputs of the least significant counter 180, all four of the preset inputs of the middle counter 182, and only one preset input of the most significant counter 184.

The counters 180, 182, 184 are clocked by the phase B clock signal B applied thereto; are enabled for counting by a signal ENABLE applied to the counter 180 from the reduction counter 28; and are loaded by the signal $\overline{LWC}$ from the input sequencer 40.

The outputs of the counters 180, 182 and 184 are applied to appropriate inputs of registers 186, 188, which perform a latching function, and which provide signals on the outputs WA0–9, which are held until needed and then applied to the address selector 38. Outputs from pins 11 and 13 of the counters 182, 184, respectively, representing numerical values of 128 and 512, respectively, are ANDed by gate 190 to produce output signal EWC from said gate, which becomes active at count 640, and which is applied to the input sequencer 40, to indicate that the write address counter 32 has counted to the limit of its capacity.

Figure 6C:
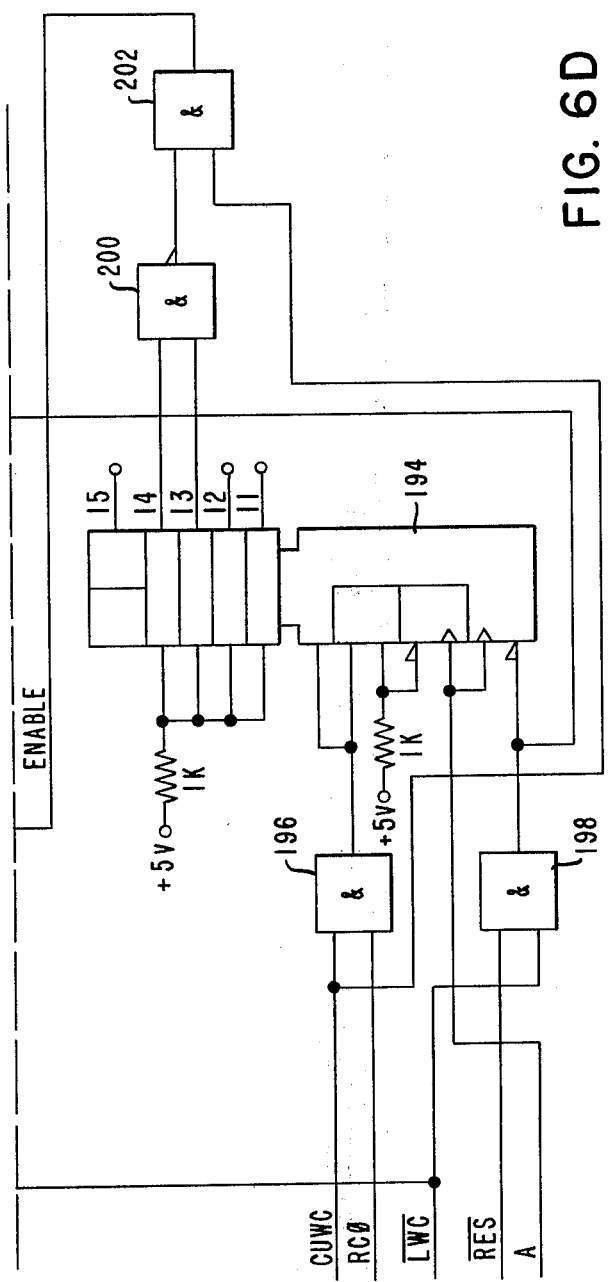
Figure 6C:
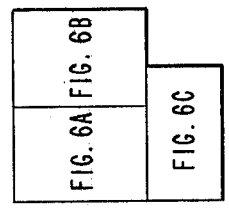

Shown in FIG. 6C is the detailed circuitry for the reduction counter 28, which includes a counter 194 which may be of type 74LS161; a pair of AND gates 196, 198, which may be of type 74LS08; a NAND gate 200 which may be of type 74LS00; and an AND gate 202, which may be of type 74LS08.

The counter 194 is driven by a phase A clock signal A. It is enabled by a combination of two signals CUWC and RC0 applied to the inputs of the AND gate 196. The signal CUWC comes from the input sequencer 40, and the signal RC0 comes from the height code and reduction latch 22. The counter 194 is reset by either one of two signals ($\overline{LWC}$ or $\overline{RES}$) applied to the inputs of the AND gate 198. The signal $\overline{LWC}$ comes from the input sequencer 40 and the signal $\overline{RES}$ is a reset signal derived from the decompression clear signal $\overline{DECOMP\ CLR}$ originating outside the system.

Two of the outputs from the counter 194 are applied as inputs to the NAND gate 200 to detect a count of three, and the output from that gate is applied as an input to the AND gate 202, together with the signal CUWC from the input sequencer 40. The output from the AND gate 202 is the signal ENABLE which is applied, as previously described, to the write address counter 32.

Counter 194 counts through a series of four counts repetitively, in the illustrated embodiment. It is enabled or disabled by the combination of signals CUWC and RC0. The signal CUWC is inactive when the input sequencer 40 is causing the loading of mode and run length data, thus preventing operation of counter 194 at such a time. The signal RC0 is inactive when no image reduction is taking place, thus preventing operation of the counter 194 at such a time. When said counter is not operating, both of the inputs to the NAND gate 200 remain inactive, or low, and the output of said gate remains high, thus permitting the signal ENABLE applied to the write address counter 32 to remain active, so that said counter can continue to count uninterruptedly.

On the other hand, when the signal RC0 is high, the counter 194 can count, and once every four counts, in the illustrated embodiment, both inputs to the NAND gate 200 will be high, causing the output from said gate to be low, and thereby causing the signal ENABLE from gate 202 to go low, so that one count of the write address counter 32 is lost.

It will be readily understood that other reduction ratios than the illustrated one of one in four could be achieved if desired by connecting different outputs of the counter 194 to inputs of the NAND gate 200. In the illustrated embodiment, both of the pins 13 and 14 of the counter 194 are high when the count of said counter is 3, but not when the count is 0, 1, or 2.

Figure 8A:
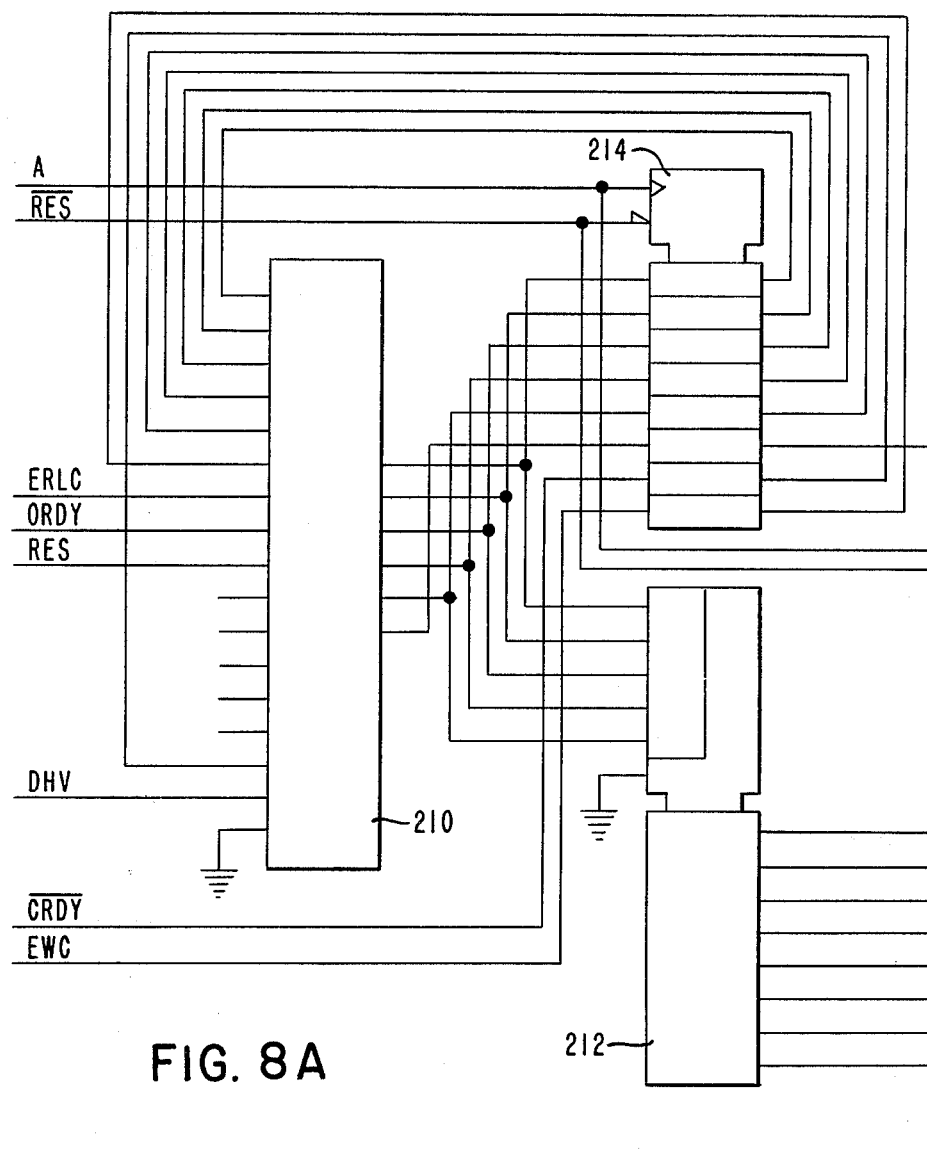
FIGS. 8A and 8B, taken together, constitute a circuit diagram showing the input sequencer circuit for the system of the present invention.
Figure 8B:
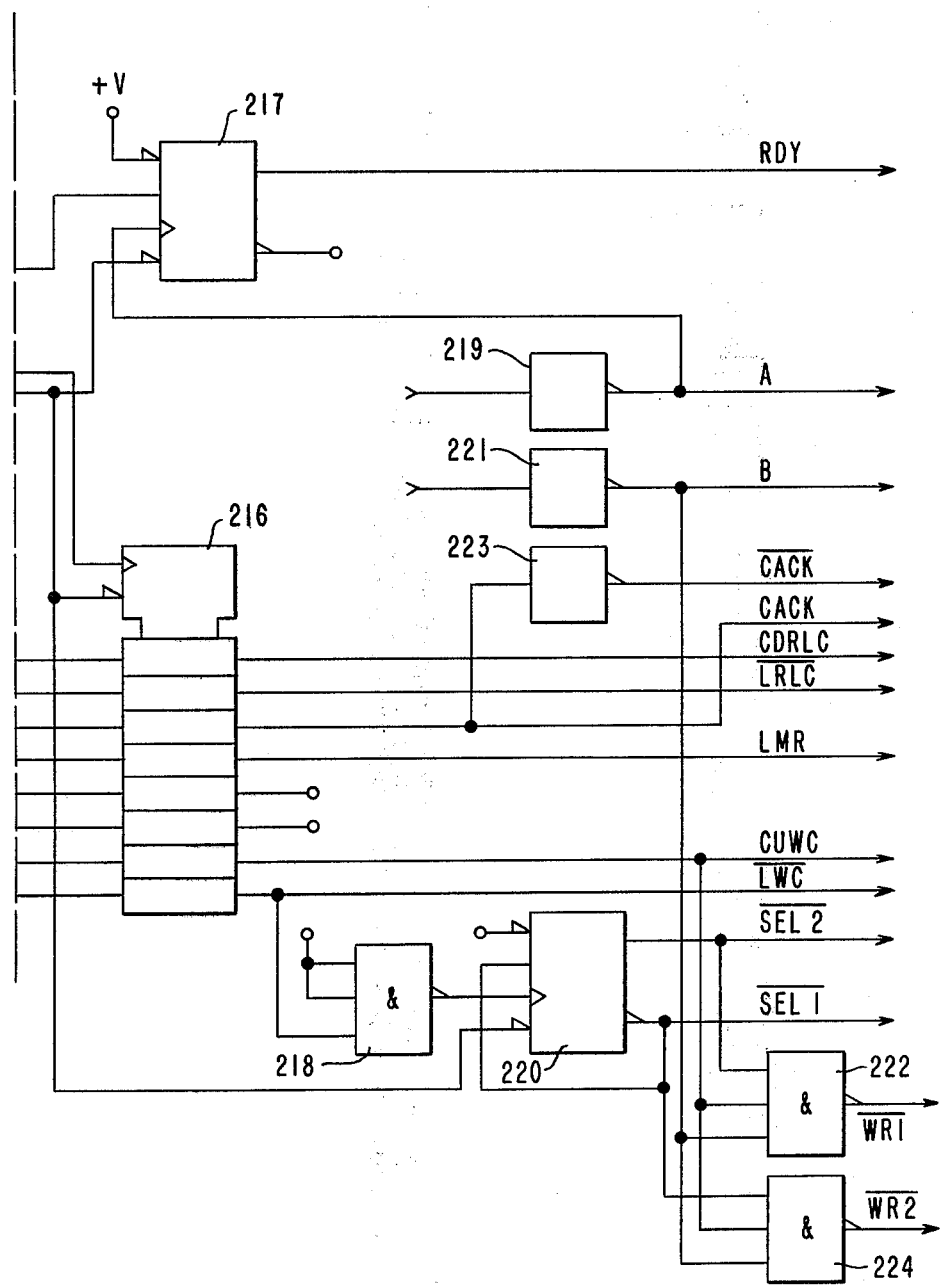

Shown in FIGS. 8A and 8B is the detailed circuitry for the input sequencer 40, which includes a field programmable logic array, or FPLA 210, which may be of type 82S100; a programmable read-only memory 212, which may be of type 82S123; two latches 214, 216, which may be of type 74LS273; a three input NAND gate 218, which may be of type 74LS10; a D-type flip-flop 220, which may be of type 74LS74; two more three input NAND gates 222 and 224, which may be of type 74LS10; a D-type flip-flop 217, which may be of type 74LS74; and three Schmitt trigger inverter gates 219, 221 and 223, which may be of type 74LS14.

The PROM 212 is utilized to expand the number of useful outputs which can be obtained from the FPLA 210. Thus, five outputs to the PROM 212 can be decoded by it to provide eight separate and distinct outputs.

It will be noted that certain of the outputs from the FPLA 210 which are latched by the latch 214 are then fed back to the FPLA 210 as inputs during the next sequential operation, to provide the desired change in the states of various output signals as predetermined by the internal programming of the FPLA 210.

It will also be noted that certain of the inputs to the FPLA 210 are not used.

The various input and output signals going to and coming from the input sequencer 40 will now be discussed, so that the relationship of this component to the remaining elements of the system may be more clearly understood.

The first such input signal is the phase A clock signal A, which is applied to the registers 214 and 216. Similarly, a reset signal $\overline{RES}$ is also applied to the two latches 214 and 216. As previously noted, the signal $\overline{RES}$ is derived from the decompression clear signal which originates outside the system, and is the first signal that appears in the sequence of operation. It is for the purpose of resetting the entire system and is applied to the sequencer, to ensure that the sequencer commences at state 0.

The next input signal to be described is the signal ERLC, which is the signal taken from the run length counter 26 when said counter has reached the count of 0.

The input signal ORDY is the ready condition signal that is applied to the input sequencer 40 from the output sequencer 30. This signal indicates that the output sequencer has read all of the data out of the selected mode buffer 34 or 36 and is now ready to switch to the opposite mode buffer to begin reading it.

The input singal RES is a reset signal which indicates to the input sequencer that the resetting has been accomplished. It is also derived from the decompression clear signal which originates outside the system.

The signal DHV indicates that the height code information has been loaded into the height code reduction register 22.

A further input signal is the signal $\overline{CRDY}$ which is fed into the latch 214, with its output being fed back around to the FPLA 210. This signal indicates when data is valid on the lines DED0-9.

The signal EWC is also applied to an input of the latch 214 and is then fed back to the FPLA 210. The signal, as previously described, is the signal indicating the reaching of the count of 640 in the write address counter.

The first output signal to be described is signal CDRLC, which is taken from the register 216, and is an enabling signal for the run length counter 26.

The output signal $\overline{LRLC}$ is also taken from the register 216 and is the signal which causes loading of the run length data into the run length counter 26 from the DED data lines.

The signal LMR, which is also taken from the latch 216, is a signal which clocks the latch of the mode register 24, and causes the mode data to be stored in the mode register from the DED lines.

The output signal CUWC from the latch 216 enables or disables the write address counter 32 and the reduction counter 28. Both of these counters are enabled by the signal CUWC.

The output signal CACK from the latch 216 is applied to the system interface to provide an acknowledgement of receipt of mode and run length data from the interface.

The signal $\overline{LWC}$ is responsible for loading or presetting the write address counter 32 with preset information determined by the height code loaded into the height code and reduction latch 22. The signal $\overline{LWC}$ also resets the reduction counter 28 to ensure that said counter is at a count of 0. The signal $\overline{LWC}$ additionally causes the mode buffer select lines to reverse, so that if the system formerly was writing to mode buffer 34, it next selects mode buffer 36, and vice versa. This is implemented through the gate 218 and the flip-flop 220. When the signal $\overline{LWC}$ changes state, it clocks the flip-flop 220, so that every time the flip-flop is clocked, the state of the output is changed. Thus, when operation commences, one of the mode buffers is selected, and the next time that there is a transition of the signal LWC, the state of the flip-flop 220 is switched, so that the selection is reversed.

The outputs of the flip-flop 220 are designated $\overline{SEL1}$ and $\overline{SEL2}$ and these are selection lines applied to the data selectors 42 and 44. In addition, the select signals $\overline{SEL1}$ and $\overline{SEL2}$ are combined with certain other signals in the AND gates 222 and 224 to provide selection signals $\overline{WR1}$ and $\overline{WR2}$ which are applied to the mode buffers 34 and 36 for selection purposes. These signals determine which of the two memories is in the write operation. It may be noted that the AND gate 218 functions as nothing more than an inverter, since two of the inputs to that gate are tied to a high voltage level.

The flip-flop 217 is driven by an output from the latch 214, is clocked by the phase A clock signal A, and is reset by the signal $\overline{RES}$. It produces the output signal RDY, which is applied to the output sequencer 30.

The gate 219 inverts to a clock signal received from the system interface to produce the phase A clock signal A.

The gate 221 inverts a clock signal received from the system interface to produce the phase B clock signal B.

The gate 223 inverts the signal $\overline{CACK}$ to produce the signal CACK, which is applied to the system interface.

Figure 9A:
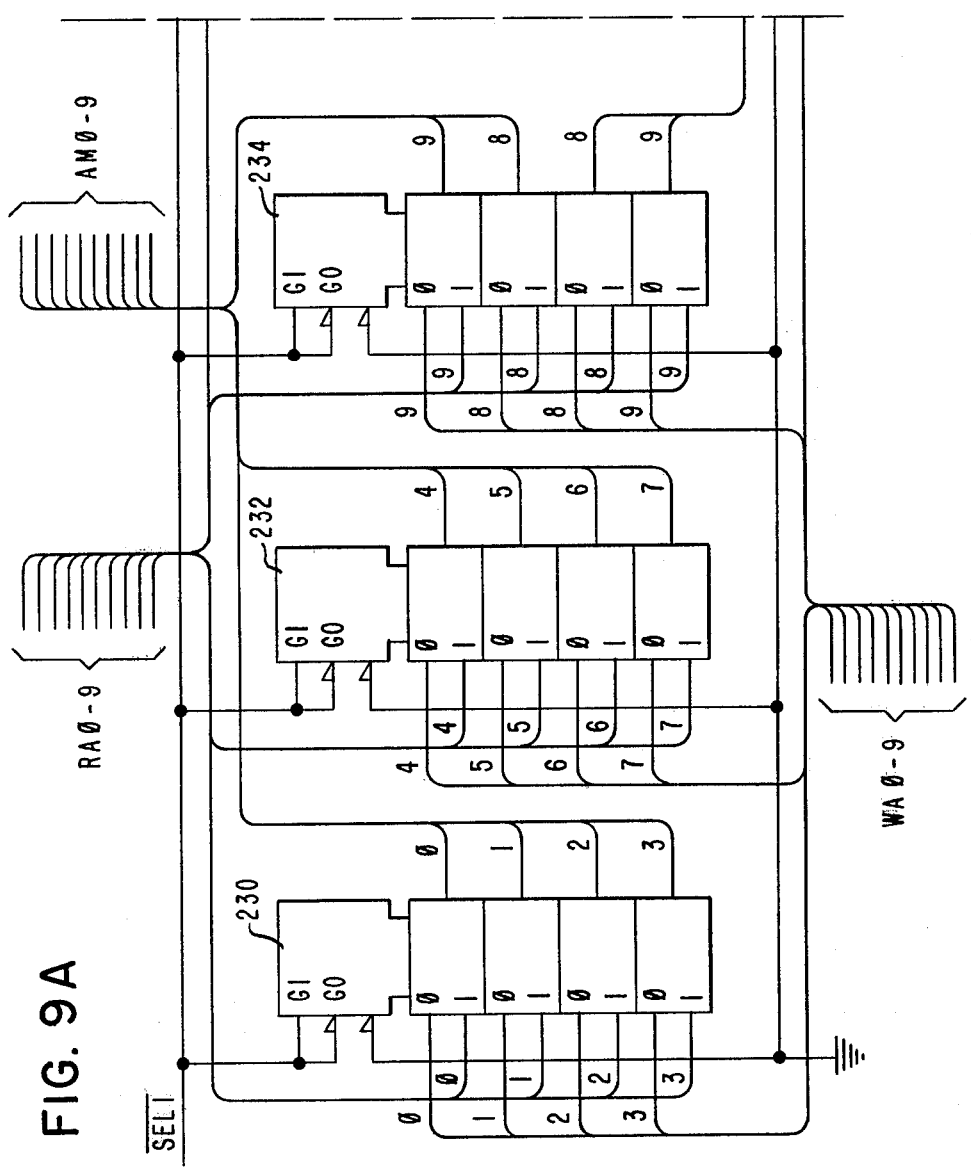
FIGS. 9A and 9B, taken together, constitute a circuit diagram showing the address selector circuit for the system of the present invention.
Figure 9B:
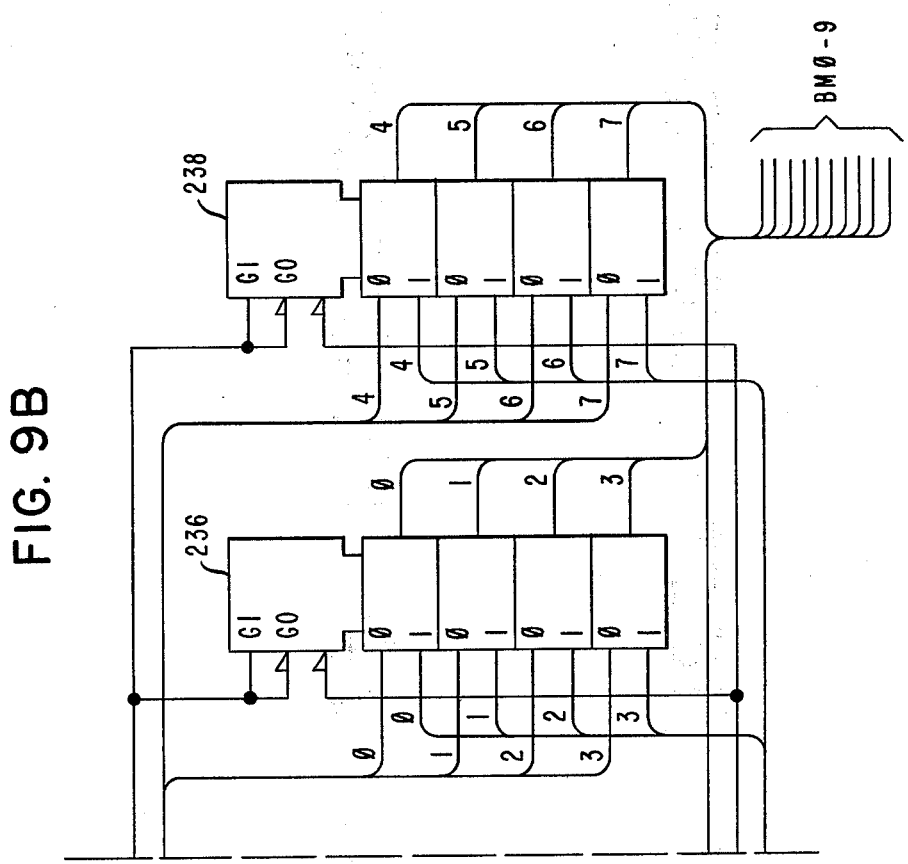

Shown in FIGS. 9A and 9B is the detailed circuitry for the address selector 38, which includes five data selector/multiplexers 230, 232, 234, 236, 238, which may be of type 74S157. The address selector 38 essentially functions as a switch, to connect either the write address counter 32 or the read address counter 52 to one of the mode buffers 34 or 36, for the purpose of either writing information therein or reading information therefrom.

The read address signals on lines RA0-9 and the write address signals on lines WA0-9 are held by latches, and are applied to corresponding inputs of the multiplexers 230, 232, 234, 236, 238. These multiplexers are functionally divided into two groups, with multiplexers 230, 232, and two sections of multiplexer 234 being dedicated to the mode buffer 34 by lines AM0-9; and with multiplexers 236, 238 and the other two sections of multiplexer 234 being dedicated to the mode buffer 36 via lines BM0-9.

Switching of the address selector 38 to enable the signals on lines RA0-9 and WA0-9 to be applied either to the lines AM0-9 or BM0-9 is accomplished by means of the signal $\overline{SEL1}$, which is applied to pin 1 of each of the multiplexers 230 to 238. When the signal $\overline{SEL1}$ is high, the multiplexers function to apply the input signal at the "0" input of each multiplexer section to the associated output pin, and when the signal $\overline{SEL1}$ is low, the multiplexers function to apply the input signal at the "1" input of each multiplexer section to the associated output pins. Thus, for example, when signal $\overline{SEL1}$ is high, the signal on line RA4 which is applied to the "1" input of the uppermost section of multiplexer 232 does not appear on the output of that section, while the same signal which is applied to the "0" input of the uppermost section of multiplexer 238 appears on the corresponding output of that section and is transmitted on line BM4 to mode buffer 36.

Figure 10A:
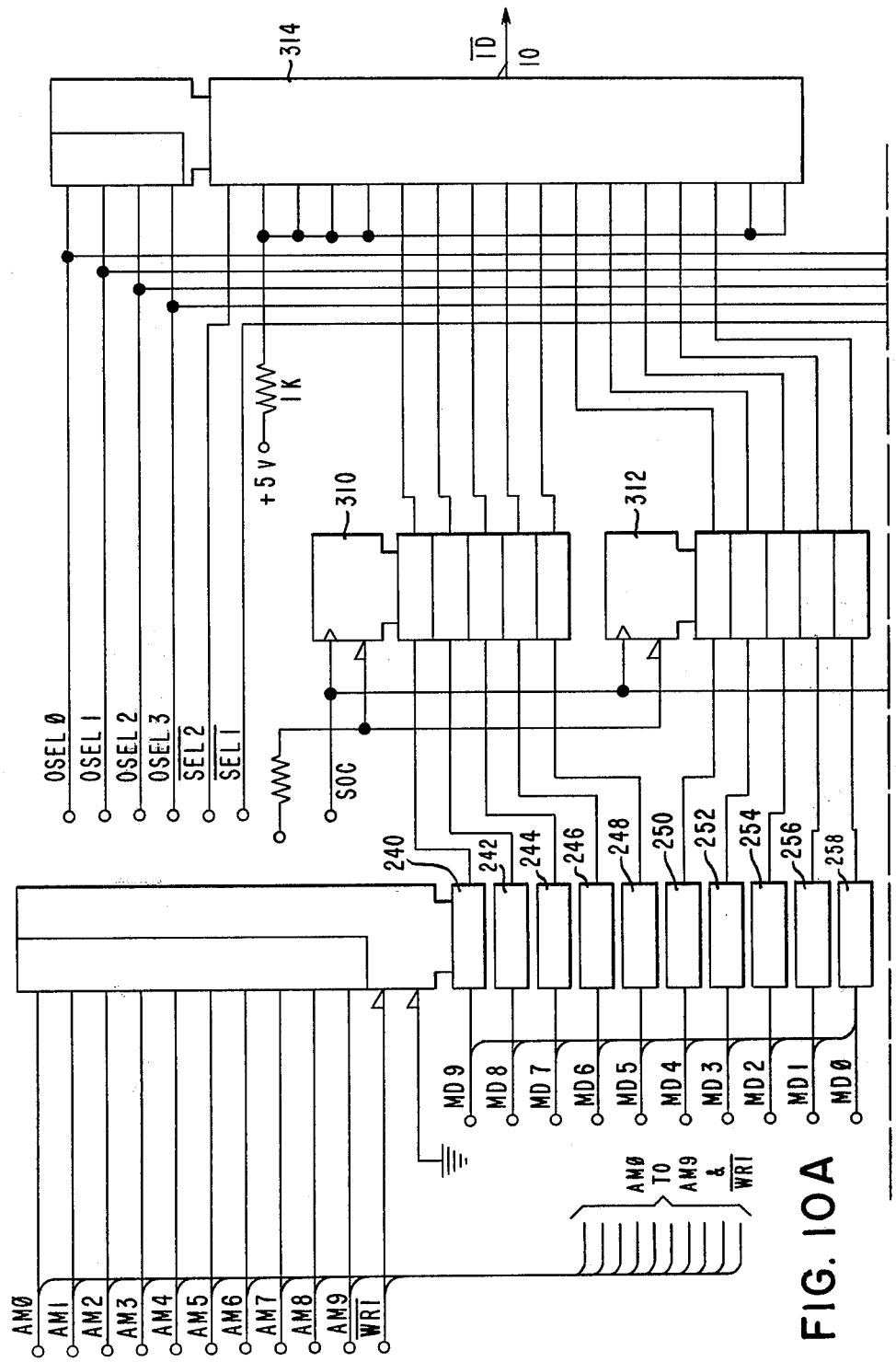
FIGS. 10A and 10B, taken together, constitute a circuit diagram showing the mode buffer and data selector circuits for the system of the present invention.
Figure 10B:
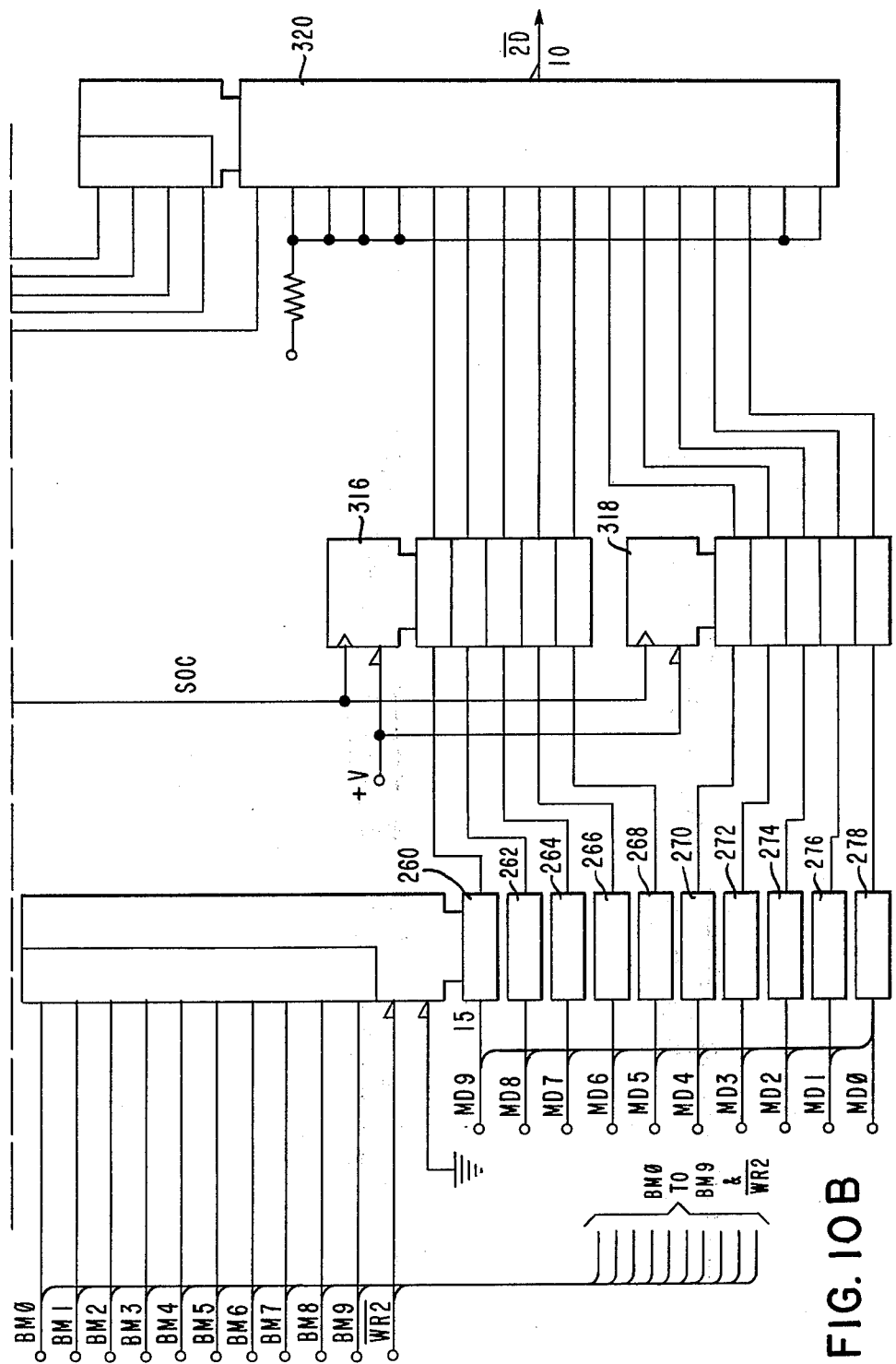

Shown in FIGS. 10A and 10B is the detailed circuitry for the mode buffers 34 and 36, which include twenty storage units 240 to 278, each of which may be of type 82S111. Storage units 240 and 260 are fully represented, while the remaining units are shown only in abbreviated block form, in the interest of conservation of space. Each of the mode buffers 34 and 36 includes ten of said memories connected in a parallel arrangement, with each of said memories having a 640-bit capacity and being used to store the equivalent of one line of image information, so that each mode buffer 34 or 36 has an effective storage capacity of ten lines of 640 bits each.

As previously indicated, address lines AM0-9 are applied in parallel to the ten storage units 240 to 258 comprising buffer 34, and the address lines BM0-9 are applied in parallel to the ten storage units 260 to 278 comprising buffer 36. Mode data lines MD0-9 from the mode register 24 are applied to pins 15 of the corresponding ten storage units of each of the mode buffers 34 and 36 during a write operation. Mode buffer selection during writing is controlled by signals $\overline{WR1}$ and $\overline{WR2}$ from the input sequencer 40, as previously described. The time-synchronized application of signals on the address lines AM0-9 or BM0-9 and the mode data lines MD0-9 results in storage of image information, ten bits at a time, in the selected buffer 34 or 36.

In a read-out operation, the selected signal $\overline{WR1}$ or $\overline{WR2}$ is high, address selection is controlled by signals on the address lines AM0-9 and BM0-9, and mode buffer selection is controlled by the data selectors 42 and 44.

Figure 7A:
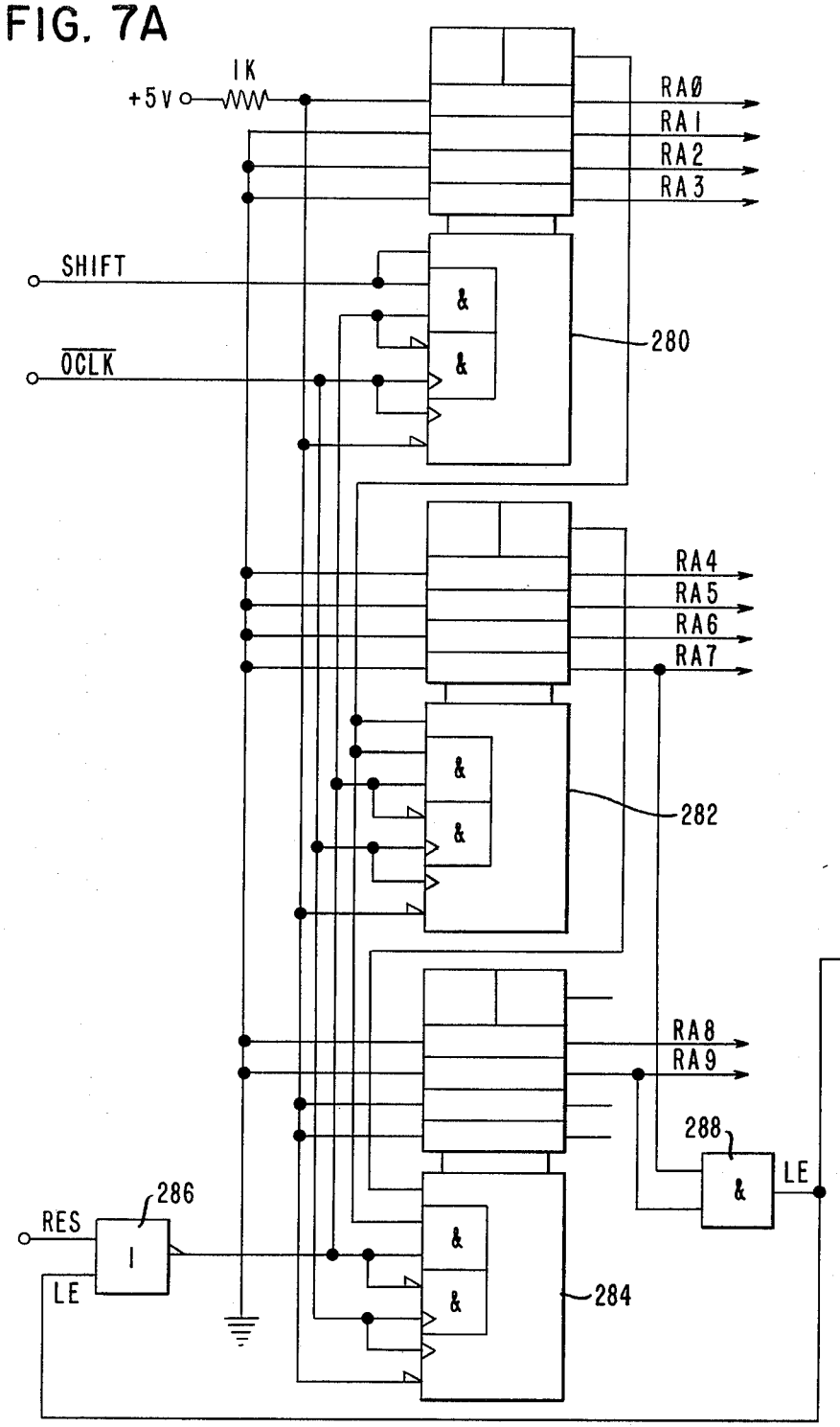
FIGS. 7A and 7B, taken together, constitute a circuit diagram showing the output sequencer and the read address counter circuits for the system of the present invention.

Shown in FIG. 7A is the detailed circuitry for the read address counter 52, which includes three serially connected, or cascaded, counters 280, 282 and 284, which may be of type 74LS161; a NOR gate 286, which may be of type 74LS02; and an AND gate 288, which may be of type 74LS08.

The counters 280, 282 and 284 are driven by a clock signal $\overline{OCLK}$ which is derived from a signal originating outside the system. Also applied to the counter 280 is an enabling signal SHIFT, which originates in the output sequencer 30, and which enables functioning of the read address counter 52 when the output sequencer 30 is functioning.

Read address output lines RA0-9 extend from the read address counter 52 to the address selector 38, with lines RA0-3 coming from the counter 280, lines RA4-7 coming from the counter 282 and lines RA8 and RA9 coming from the counter 284. The signals from lines RA7 and RA9 are also applied to inputs of the AND gate 288 to provide an output signal LE indicating when the counter has reached its maximum count of 640. This output signal is applied to the output sequencer 30 and is also applied to the one input of the NOR gate 286. A reset signal RES from the system interface is applied to the other input of the gate 286 to cause the counter 52 to be reset when appropriate.

Figure 7B:
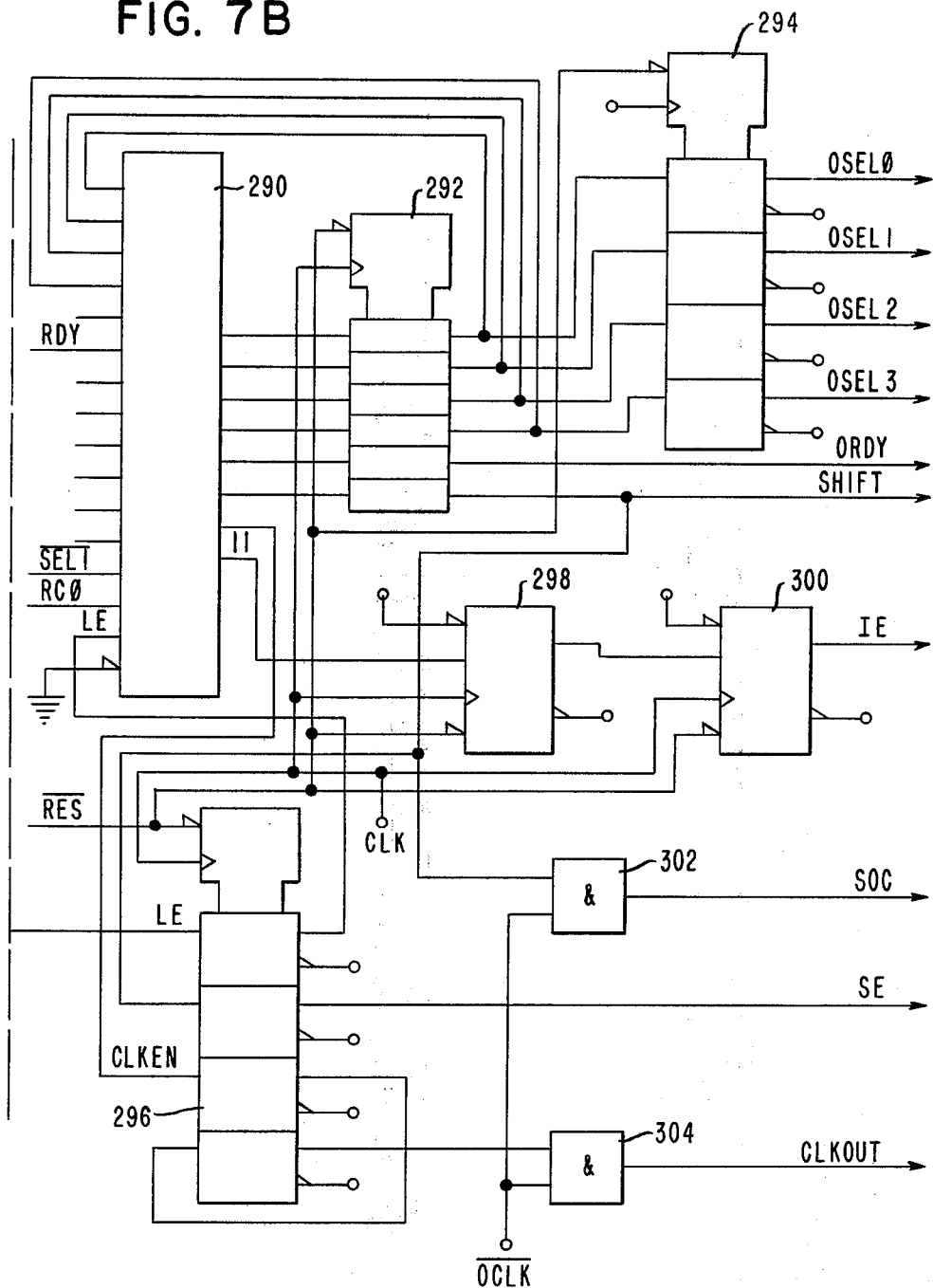

Shown in FIG. 7B is the detailed circuitry for the output sequencer 30, which includes an FPLA (field programmable logic array) 290 which may be of type 82S100; a register 292 which may be of type 74LS174; two registers 294 and 296 which may be of type 74LS175; two D-type flip-flops 298 and 300 which may be of type 74LS74; and two AND gates 302 and 304 which may be of type 74LS08.

Inputs to the output sequencer circuitry include a signal RDY which comes from the input sequencer 40, and is active whenever a mode buffer 34 or 36 is full of data and ready for output; a select signal $\overline{SEL1}$ from the input sequencer 40, which identifies the mode buffer 34 or 36 that is ready for output; the data reduction signal RC0 from the height code and reduction latch 22 which is active when image data is to be reduced, the signal LE derived from the 640 detect line from the read address counter 52 which is active when the bottom of a column of dots in the mode buffer has been reached; the reset signal $\overline{RES}$ which comes from the system interface logic and is active whenever there is a decompression clear signal $\overline{DECOMP\ CLR}$; and a clock signal CKL derived from the system interface logic.

The register 294 functions to latch the column address signals which appear on the select lines OSEL0-3, which define the state number of the output sequencer 30, and which are directed to the data selectors 42 and 44.

The registers 292 and 296 function to latch the outputs of the FPLA 290 on every clock edge. It will be noted that certain of the outputs from the FPLA 290 which are latched by the latch 292 are then fed back to the FPLA 290 as inputs during the next sequential operation, to provide the desired change in the states of various output signals as predetermined by the internal programming of the FPLA 290. It will also be noted that certain of the inputs of the FPLA 290 are not used.

The purpose of the flip-flop 298 is to latch one of the outputs of the FPLA 290. The second flip-flop 300 takes the output of flip-flop 298 and delays it by one clock to produce the output signal IE in the desired time period. The signal IE is low after registers 292 and 296 receive reset signals and is used to initialize the output shift register 48, in order to clear it.

The output signal ORDY from the FPLA 290 is fed back to the input sequencer 40 to indicate that output processing is complete, and that the mode buffer 34 or 36 being ready from is empty.

The output signal SHIFT from the FPLA 290 is active whenever the output sequencer 30 is in an outputting mode, and performs a number of functions, including enabling the read address counter 52, as previously described. Other functions include enabling or disabling the clock signal SOC, which latches data coming out of the mode buffer 34 or 36 to the data selector 42 or 44. The signal SHIFT is applied to one input of the AND gate 302, with the clock signal $\overline{OCLK}$ being applied to the other input, and the signal SOC is taken from the output of the gate 302.

The signal SHIFT is delayed one clock period by passing through the latch 296 and becomes signal SE which is applied to the output shift register 48 to enable said register whenever there is a read out from one of the mode buffers and to disable said register whenever the output sequencer 30 has emptied the selected mode buffer and is awaiting further instructions.

The signal CLKEN from output pin 11 of the FPLA 290 passes through the latch 296 twice to provide a desired delay and is applied to one input of the AND gate 304, to the other input of which the clock signal $\overline{OCLK}$ is applied. The output of the gate 304 is the signal CLKOUT, which is directed to the output shift register 48, and changes states in accordance with whether or not image data is to be reduced during system operation.

Shown in FIGS. 10A and 10B is the detailed circuitry for the data selectors 42 and 44, each of which includes two D-type flip-flops which may be of type 74LS174 and which function as latches, and a data selector/multiplexer which may be of type 74150. Latches 310, 312 and multiplexer 314 are included in data selector 42, and latches 316, 318 and multiplexer 320 are included in data selector 44.

It will be recalled from the earlier description of the system that data selector 42 is coupled to the mode buffer 34, and that data selector 44 is coupled to the mode buffer 36. Stored data from the mode buffer 34 is latched in the latches 310, 312, the inputs of which are connected to corresponding outputs of the storage units 240, 242, 244, 246, 248, 250, 252, 254 and 256. Similarly, stored data from the mode buffer 36 is latched in the latches 316, 318. The latches 310 and 312 are controlled by the signal SOC from the output sequencer 30 and maintain the stored data on the inputs of the multiplexer 314. The latches 316, 318 are also controlled by the signal SOC, and perform a similar function with respect to the multiplexer 320. Selection of one or the other of the multiplexers 314 or 320 is controlled by the select lines $\overline{SEL1}$ and $\overline{SEL2}$. In the selected multiplexer, data from only one input at a time is caused to appear on its output at pin 10, as signal $\overline{1D}$ from multiplexer 34 and a signal $\overline{2D}$ from multiplexer 320 by virtue of the signals on the select lines OSEL0 to OSEL4. It will be recalled that these signals originate in the output sequencer 30, and correspond to the various state through which that device progresses during the course of a read-out operation. The output signals $\overline{1D}$ and $\overline{2D}$ thus constitute a serial read-out of the image information contained in the selected mode buffer 34 or 36.

Figure 11A:
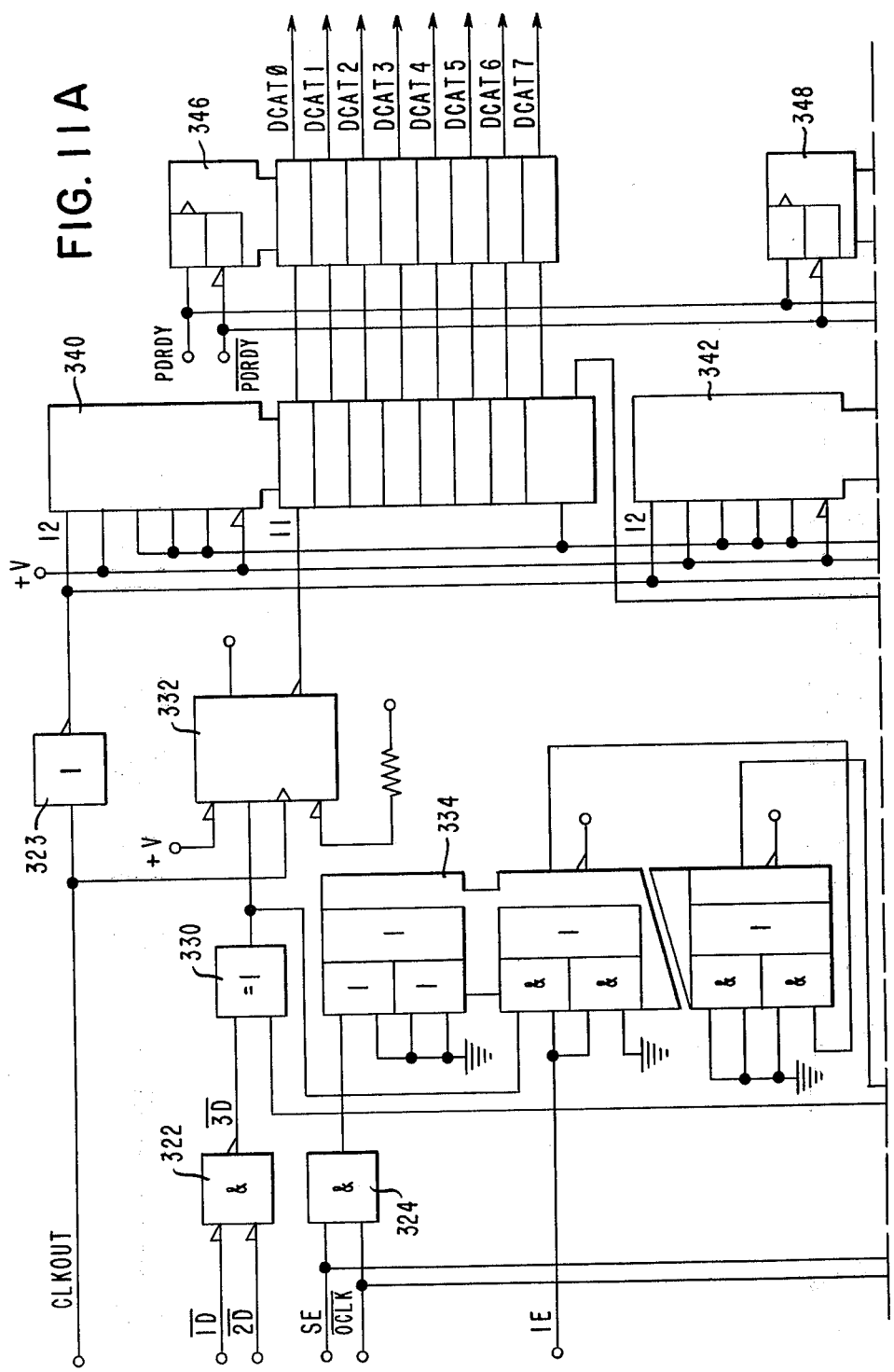
FIGS. 11A and 11B, taken together, constitute a circuit diagram showing the OR gate and output shift register circuits for the system of the present invention.

Shown in FIG. 11A is the detailed circuitry for the "OR" gate 46, which includes a NAND gate 322, which may be of type 74LS00. The lines $\overline{1D}$ and $\overline{2D}$, from the data selectors 42 and 44, respectively, are applied as inputs to the gate 322, and an output from said gate provides the line $\overline{3D}$, on which the image information data signal from the selected mode buffer 34 or 36 appears.

Figure 11B:
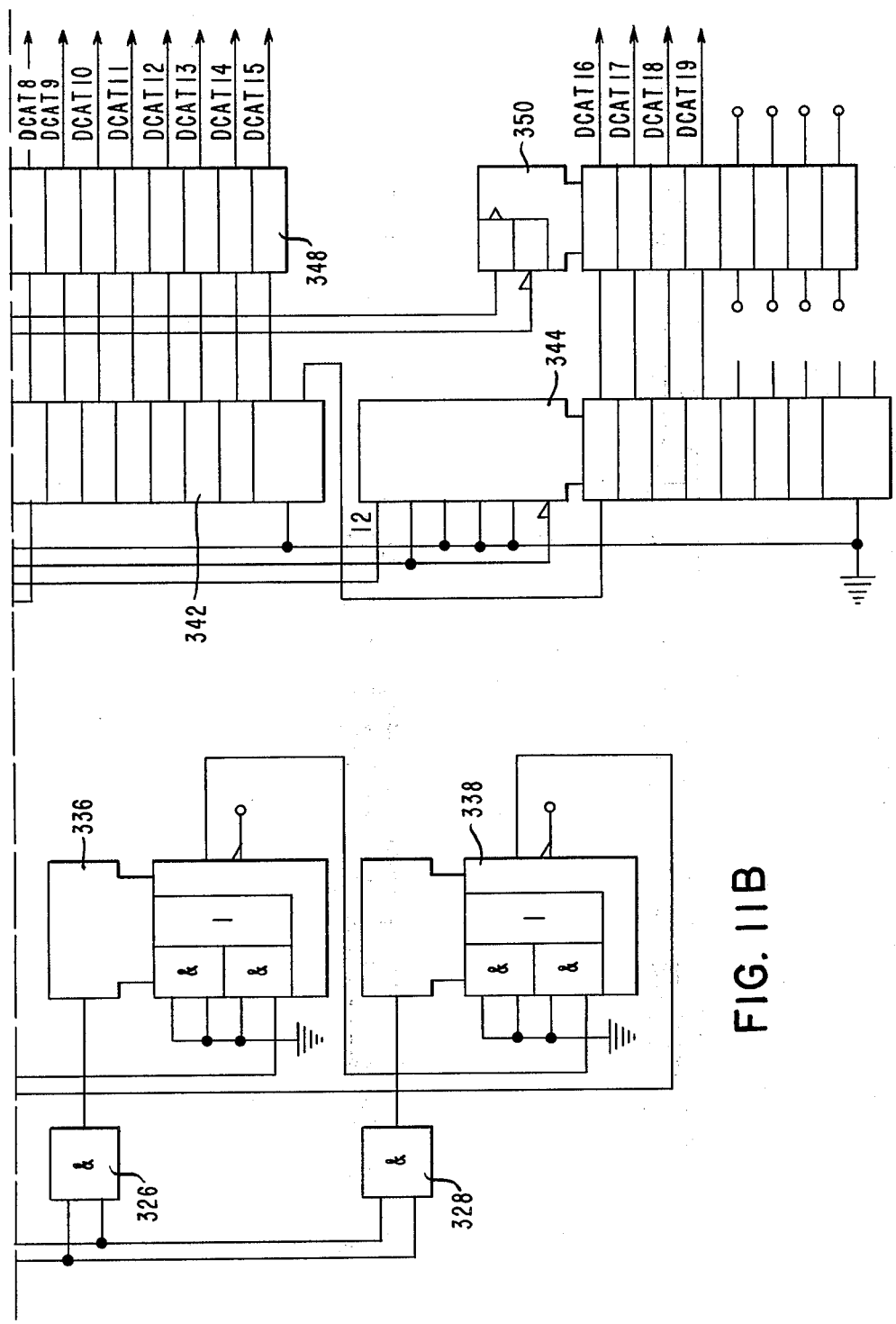

Shown in FIGS. 11A and 11B is the detailed circuitry for the output shift register 48, which includes an inverter 323 which may be of type 74LS04; three AND gates 324, 326 and 328 which may be of type 74S08; and Exclusive OR gate 330, which may be of type 74S86; a D-type flip-flop 332, which may be of type 74S74; a dual 64-bit shift register 334 which may be of type TDC1005J; two 256-bit shift registers 336 and 338 which may be of type TDC1006J; three bi-directional shift registers 340, 342 and 344 which may be of type 74LS299; and three octal D-type flip-flops 346, 348, 350, which may be of type 74LS374.

The cascaded combination of registers 334, 336 and 338 provides a shift register 640 bits long. Data is clocked through this register combination and fed back to one input of the gate 330, the other input of which receives the image information data signal from the gate 46 on the line $\overline{3D}$. This in effect compares the information contained on one complete 640 bit line with corresponding information at the same relative positions on the next 640 bit line. The gate 330 outputs a "1" in those cases where the bits differ from line to line, and a "0" in those cases where they do not. The output of the gate 330 is applied as an input to the flip-flop 332. Inputs to the registers 334, 336, 338 include a signal IE from the output sequencer 30, and the signals SE and $\overline{OCLK}$ which are applied as inputs to the AND gates 324, 326, 328, the outputs of which are applied respectively to the registers 334, 336, 338. It may be noted that the components 324, 326, 328, 330, 334, 336 and 338, and their interconnections, form a circuit implementation of a decompression algorithm which takes the compressed image data as it appears from the OR gate 46 and adds the necessary predetermined data to it to provide a decompressed version of the image data which was compressed for transmission purposes in order to achieve greater economy. The decompression circuit, per se, does not form a part of the present invention.

The flip-flop 332 provides at its output the decompressed image information signal which is applied to pin 11 of the register 340 which is connected in cascade configuration with the registers 342 and 344. These registers are clocked by the CLKOUT signal from the output sequencer 30 which is inverted by the inverter 323 and applied to the clock inputs at pin 12 of the registers 340, 342, 344.

The decompressed data information from the flip-flop 323 is loaded serially into the cascaded registers 340, 342, 344 in twenty-bit segments, since these cascaded registers have an effective capacity in this application of twenty bits, until all 640 bits of the data line being processed have been run through said registers. These registers serve essentially to buffer the output line of data and to convert it into a form which can be read out in parallel. The operation of the registers is controlled by the clock signal CLKOUT and may be disabled by the output sequencer 30, as previously described, when a data reduction operation is being carried out. The entire circuitry of the output shift register 48 may be disabled by the output or utilizing device.

The latches 346, 348, 350 are connected to the outputs of the registers 340, 342 and 344, and latch the twenty-bit segments appearing on those outputs for subsequent delivery in parallel form to a utilizing device on the lines DCAT0-19. The latches 346, 348 and 350 are clocked by the signal PDRDY applied thereto. The signal $\overline{PDRDY}$ is also applied to the latches 346, 348, 350 and provides an enabling function. The signals PDRDY and $\overline{PDRDY}$ are derived from the clock signal OCLK to provide one pulse for every twenty pulses of the signal OCLK.

When one segment of twenty bits is latched into the latches 346, 348, 350, the next twenty bit segment is introduced into the registers 340, 342, 344, and is thus available at the inputs of the latches 346, 348, 350 as soon as the information then held in these latches is accepted by the utilizing or output device. Since the utilizing or output device normally operates at a slower speed than the system circuitry, the operation of the entire circuitry of the output shift register 48 will normally be periodically interrupted by disabling of the signals CLKOUT andd SE under control of the utilizing device, as previously mentioned.

While the form of the invention shown and described herein is admirably adapted to fulfill the objects primarily stated, it is to be understood that it is not intended to confine the invention to the form of embodiment disclosed herein, for it is susceptible of embodiment in various other forms within the scope of the appended claims.

We claim:

1. Image reduction apparatus for deleting portions of image representations, comprising:
   storage means for storage of information used to form an image;
   output means coupled to said storage means for outputting image information to a utilizing device;
   data input means for supplying data to be entered into said storage means;
   data induction means for causing the selective elimination of data to produce a reduced data image representation;
   first means controlled by said data reduction means to cause a selective first elimination of data during data storage in said storage means; and
   second means controlled by said data reduction means to cause a selective second elimination of data during transfer of data from said storage means to said output means.

2. Image reduction apparatus for deleting portions of image representations, comprising:
   storage means for storage of information used to form an image;
   output register means coupled to said storage means for outputting data groups of image information to a utilizing device;
   data input means for supplying data in a series of segments to be entered into said storage means;
   address selector means synchronized in time with said data input means for determining addresses in the storage means into which segments of data from the data input means are entered and from which segments of data are read;
   data reduction means for causing portions of the data from the data input means to be deleted from the image information output from the output register means;
   write address counter means controlled by the data reduction means and coupled to the address selector means to provide write addresses to the address selector means and to cause one of a selected number of addresses to be repeated, thereby causing one of the data segments from the data input means to be eliminated from the storage means for each address which is repeated; and
   output sequencer means controlled by said data reduction means and coupled to said output register means to cause one of a selected number of said data groups of image information to be eliminated.

3. The apparatus of claim 2 in which said data groups comprise lines of image information.

4. The apparatus of claim 2 in which said segments comprise a plurality of characters in corresponding positions in a plurality of image lines.

5. The apparatus of claim 2 in which the data reduction means comprises reduction latch means for receiving and maintaining image reduction data and reduction counter means controlled by the reduction latch means for generating a count representative of the amount of the image reduction, and transmitting said count to the write address counter means for controlling write address generation.

6. The apparatus of claim 2 in which the storage means includes first and second buffer means; associated first and second data selection means; and gating means, whereby data can be input to one of said first and second buffer means while data is being read out of the other of said buffer means through said associated data selection means and applied to said output register means through said gating means.

7. The apparatus of claim 6 in which said gating means is an OR gate.

8. The apparatus of claim 6, also including input sequencer means for selecting which of the first and second buffer means is to be written into with data from the data input means, and which of the first and second buffer means is to be read out through its associated data selection means.

9. The apparatus of claim 8, in which the write address counter means also includes capacity count means coupled to the input sequencer means to control the input sequencer means to cause said input sequencer means to switch the first or second buffer means from a mode in which data is being written into it to a mode in which data is being read from it when the storage capacity of said buffer means is reached.

10. The apparatus of claim 9, in which the data reduction means also includes height code preset means which controls the write address counter means to cause the capacity count means to commence count at a value other than zero when a reduced image representation is to be provided by the apparatus.

11. The apparatus of claim 8, also including run length counter means coupled to the input sequencer means for controlling the number of times that the same segment of data from the data input means is stored in the storage means.

12. The apparatus of claim 2, also including read address counter means coupled to the address selector means and the output sequencer means to provide sequential addresses to the address selector means to cause stored data to be read from the storage means at those addresses.

13. Image reduction apparatus for deleting portions of image representations, comprising:
   storage means for storage of information used to form an image;
   output register means coupled to said storage means for outputting lines of image information to a utilizing device;
   data input means for supplying data in a series of segments to be entered into said storage means;
   address selector means synchronized in time with said data input means for determining addresses in the storage means into which segments of data from the data entry means are entered and from which segments of data are read;
   reduction latch means for receiving and maintaining image reduction data;
   reduction counter means controlled by the reduction latch means for generating a count representative of the amount of the image reduction, and transmitting said count to the write address counter means for controlling write address generation;
   write address counter means controlled by the reduction counter means and coupled to the address selector means to provide write addresses to the address selector means to cause certain predetermined addresses to be repeated, thereby causing one of the data segments from the data input means to be eliminated from the storage means for each address which is repeated;
   output sequencer means controlled by the reduction latch means and coupled to said output register means to cause selected lines of image information to be eliminated, and
   read address counter means coupled to the address selector means and the output sequencer means to provide sequential addresses to the address selector means to cause stored data to be read from the storage means at those addresses.

14. The apparatus of claim 13 in which the storage means includes first and second buffer means; associated first and second data selection means; and gating means, whereby data can be input to one of said first and second buffer means while data is being read out of the other of said buffer means through said associated data selection means and applied to said output register means through said gating means.

15. The apparatus of claim 14 in which said gating means is an OR gate.

16. The apparatus of claim 14, also including input sequencer means for selecting which of the first and second buffer means is to be written into with data from the data input means, and which of the first and second buffer means is to be read out through its associated data selection means.

17. The apparatus of claim 16, in which the write address counter means also includes capacity count means coupled to the input sequencer means to control the input sequencer means to cause said input sequencer means to switch the first or second buffer means from a mode in which data is being written into it to a mode in which data is being read from it when the storage capacity of said buffer means is reached.

18. The apparatus of claim 17, in which the data reduction means also includes height code preset means which controls the write address counter means to cause the capacity count means to commence count at a value other than zero when a reduced image representation is to be provided by the apparatus.

19. The apparatus of claim 16, also including run length counter means coupled to the input sequencer means for controlling the number of times that the same segment of data from the data input means is stored in the storage means.

* * * * *

UNITED STATES PATENT AND TRADEMARK OFFICE
CERTIFICATE OF CORRECTION

PATENT NO. : 4,412,252

DATED : October 25, 1983

INVENTOR(S) : Robert S. Moore et al.

It is certified that error appears in the above—identified patent and that said Letters Patent is hereby corrected as shown below:

Column 17, line 50 delete "induction" and substitute --reduction--.

Signed and Sealed this

Twenty-eighth Day of August 1984

[SEAL]

Attest:

GERALD J. MOSSINGHOFF

Attesting Officer          Commissioner of Patents and Trademarks